United States Patent [19]

Castricum

[11] Patent Number: 4,706,481
[45] Date of Patent: Nov. 17, 1987

[54] APPARATUS FOR CUTTING HOLLOW PIPE

[75] Inventor: Wilhelmus P. H. Castricum, Rolling Meadows, Ill.

[73] Assignee: Spiro America Inc., Wheeling, Ill.

[21] Appl. No.: 876,286

[22] Filed: Jun. 17, 1986

Related U.S. Application Data

[63] Continuation-in-part of Ser. No. 746,237, Jun. 18, 1985, abandoned.

[51] Int. Cl.$^4$ ............................................ B21C 37/12
[52] U.S. Cl. ........................................ 72/49; 72/132; 82/53.1; 82/58; 82/92; 82/94
[58] Field of Search ..................... 72/49, 50, 129, 132, 72/135; 82/53.1, 58, 82, 92, 94; 83/187, 308, 318, 320; 228/17.7, 145, 147

[56] References Cited

U.S. PATENT DOCUMENTS

| | | | |
|---|---|---|---|
| 684,539 | 10/1901 | Cartwright | 83/308 |
| 694,524 | 3/1902 | Boyd | 82/58 |
| 957,966 | 5/1910 | Jenkins | 82/94 |
| 1,345,458 | 7/1920 | Pierce | 82/58 |
| 3,132,616 | 5/1964 | Hale et al. | 72/148 |
| 3,913,430 | 10/1975 | Van Dijk | 82/82 |
| 3,982,414 | 9/1976 | Anderson | 72/50 |
| 4,054,069 | 10/1977 | Coop | 82/53.1 X |
| 4,244,202 | 1/1981 | Anderson et al. | 72/49 |

FOREIGN PATENT DOCUMENTS

| | | | |
|---|---|---|---|
| 2311625 | 12/1976 | France | 82/58 |
| 830504 | 3/1960 | United Kingdom | 72/50 |
| 473572 | 9/1975 | U.S.S.R. | 82/82 |
| 531592 | 10/1976 | U.S.S.R. | 83/187 |

OTHER PUBLICATIONS

"Operation Instructions", Spiro Tubeformer 700.
"Operation Instructions", Spiro Tubeformer MR.
"Spare Part Catalog", Spiro Tubeformer 2002.
Flat Cages, IBO Bearings brochure.
THK Bearings brochure.

Primary Examiner—E. Michael Combs
Attorney, Agent, or Firm—Willian Brinks Olds Hofer Gilson & Lione Ltd.

[57] ABSTRACT

An apparatus for cutting hollow, metal, spirally formed pipes is disclosed. The apparatus uses two passive, rotatable knife blades to cut the pipe. An upper knife blade is positioned inside the pipe so that its cutting edge is adjacent to the inner pipe surface. A lower knife blade is positioned outside of the pipe so that its cutting edge is adjacent to the cutting edge of the upper knife blade in the lateral direction, but is clear of the pipe and upper knife blade in the longitudinal direction. To cut the pipe the lower knife blade is raised until its cutting edge overlaps the cutting edge of the upper knife blade. The knife blades then puncture the pipe. The pipe is rotated through the overlapping blades to completely cut the pipe. Since the pipe moves spirally (i.e., it moves forward while it rotates), the knife blades are adapted to move in the direction of the pipe during the cutting process. This permits the overlapping knife blades to cut the pipe rectangularly. The upper knife blade is attached to a cantilevered boom, and the lower knife blade is attached to a knife holder and a vertical raising device. These components are all attached to sliding guide rails so that they move with the cutting blades in the direction of the moving pipe during the cutting process.

22 Claims, 33 Drawing Figures

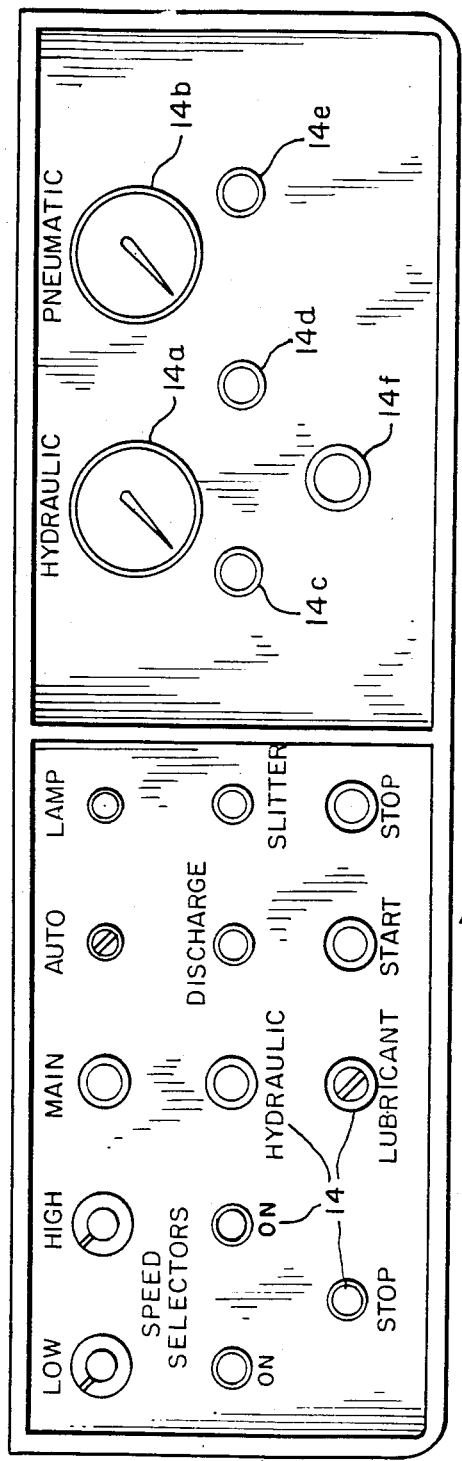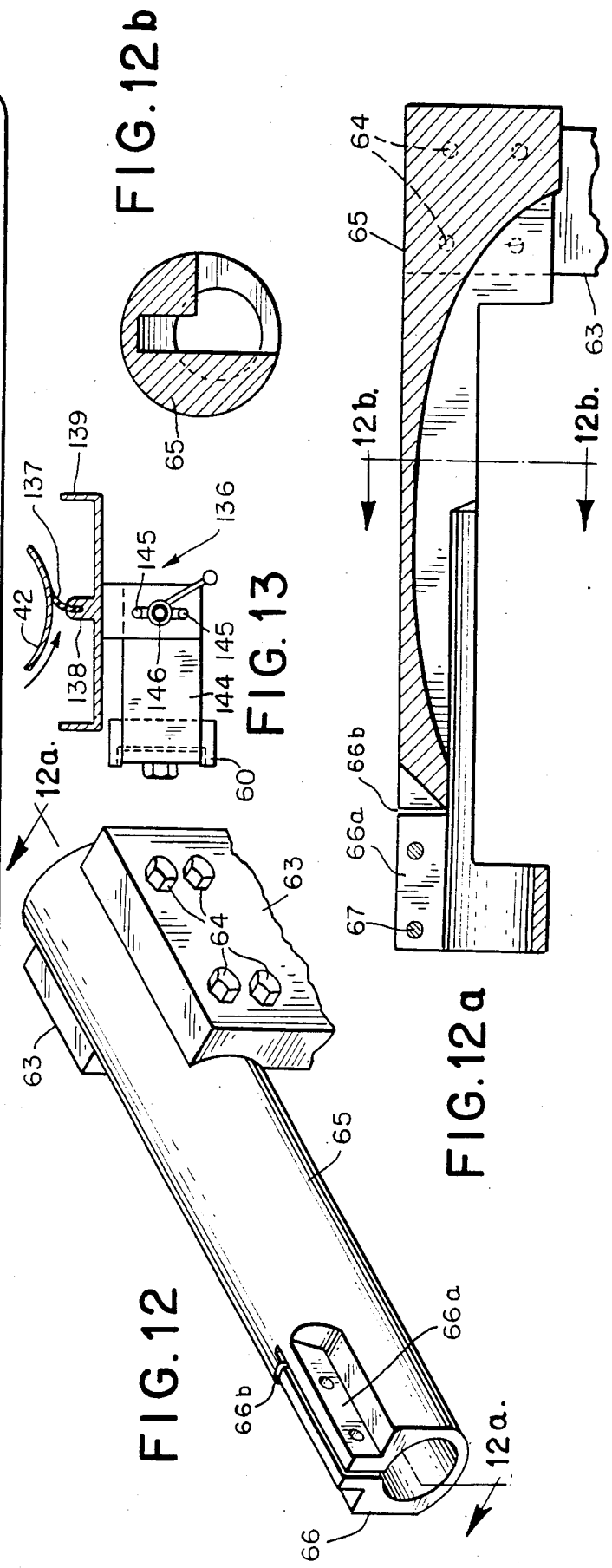

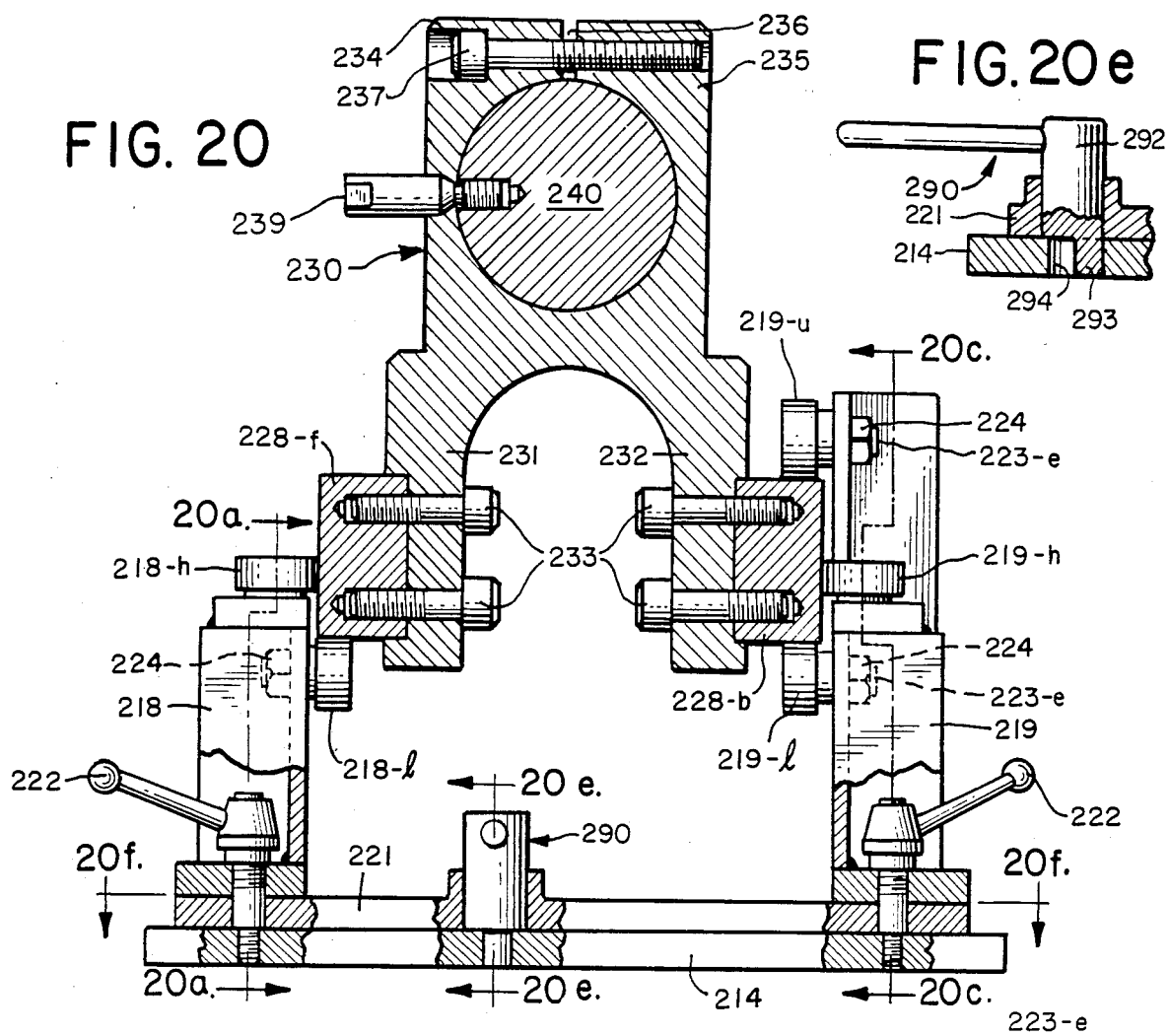
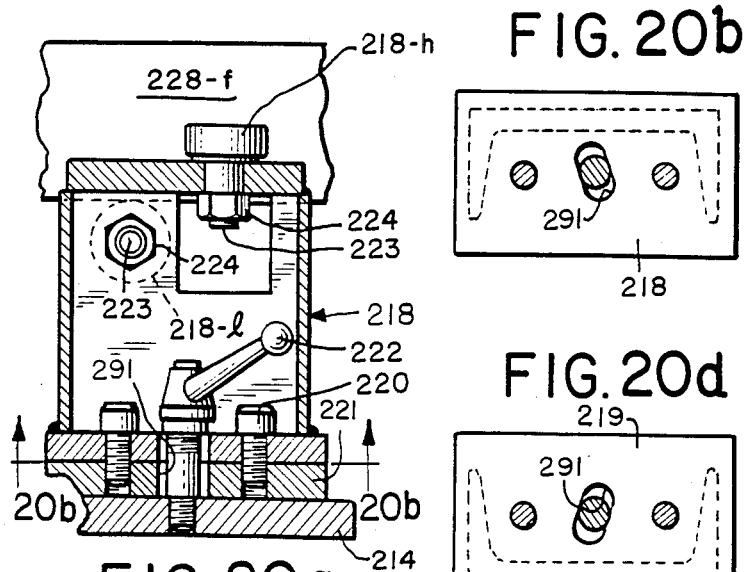
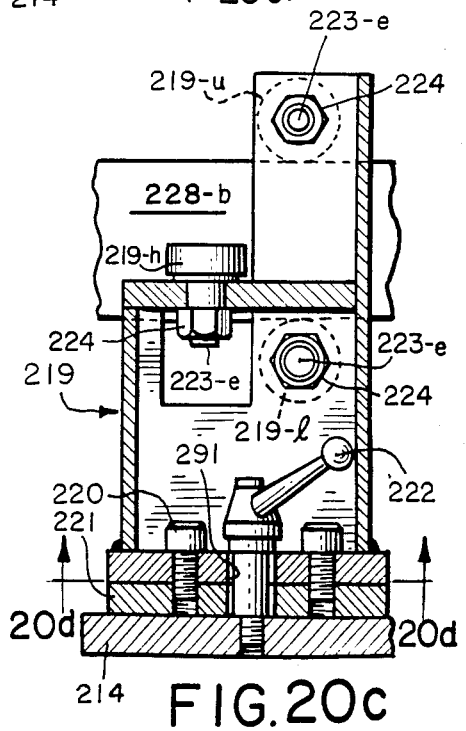

1

APPARATUS FOR CUTTING HOLLOW PIPE

This application is a continuation-in-part of application Ser. No. 746,237, filed June 18, 1985, now abandoned.

BACKGROUND OF THE INVENTION

This invention relates to an apparatus for cutting hollow pipes, particularly spirally formed, hollow metal pipes.

Hollow metal pipes are widely used for ventilation ducts. These pipes are formed from a continuous strip of thin metal. My commonly owned, U.S. Pat. No. 4,567,742, issued Feb. 4, 1986, describes a preferred machine for making triple-ribbed, spiral seam pipe. U.S. Pat. No. 3,132,616 (Hale) describes another type of machine for making corrugated, spiral seamed pipe. Both types of machine start with a flat strip of metal. The strip passes through a series of rollers which bend the edges into predetermined shapes, and form parallel corrugations or reinforcing ribs in the strip. The strip then passes around the inner surface of a forming head (a mandrel) in a spiral manner, so that the strip takes a spiral shape with opposite edges of the strip meshing. The intermeshed edges of the strip are then compressed to form the pipe with a spiral lockseam. The strip is continuously fed into the machine to continuously produce spiral seamed pipe.

At some point the pipe will reach its desired length and must be cut. The assignee of this invention has previously used a rotary saw for cutting the pipe. The saw is mounted on or near the machine, outside the pipe, where it does not interfere with the pipe forming process. When the pipe is ready to be cut, it stops moving. The saw blade is then moved into its cutting position and penetrates the pipe. The metal strip material and pipe forming operation then begin again at a slow speed. This causes the pipe to move forward and rotate. The saw is adapted to move with the pipe for one complete rotation, whereupon the pipe is completely severed. The saw is then returned to its starting position clear of the tube, and the cut pipe section is discharged onto a run-off table. The tube forming process is then repeated to produce another section of pipe.

Hale also discloses a saw blade disposed outside of a spiral seamed, hollow pipe for cutting the pipe into sections.

There are several disadvantages to using high speed saws to cut metal pipes. First, the saw blade, which rotates as fast as 5000 RPM, is dangerous to the machine operator and to anyone near the machine. Second, the saw generates a lot of sparks when it cuts the metal, which also creates a hazardous situation. Anyone near the machine must wear safety glasses to protect himself from the sparks. Third, the saw cut leaves burrs on the edge of the pipe. These burrs must be filed off by someone, who must be careful not to cut himself on the burrs. Finally, the cutting operation is very noisy.

SUMMARY OF THE INVENTION

The present invention is directed to a new type of cutting apparatus for hollow metal pipes that overcomes the disadvantages of high speed saw blades.

According to this invention, a first rotatable cutting blade is to be positioned inside a hollow metal pipe. A second rotatable cutting blade is positioned outside of the pipe. The second blade is moved towards the first blade so that the blades overlap to puncture the pipe surface. The blades are adapted to move together in the direction of the pipe, so that they will cut the pipe as the pipe moves forward and rotates between the overlapping cutting blades.

In the preferred embodiment of the invention, the first blade is rotatably mounted in the front end of a boom. The boom and first blade are position inside the pipe so that the axis of the blade is parallel to the axis of the pipe, and the circumferential edge of the blade is adjacent the inner pipe surface. The second blade is rotatably mounted in a holder outside of the pipe. The axis of the second blade should be parallel to the axis of the pipe, and its circumferential edge should be adjacent to the circumferential edge of the first blade in a lateral direction. To cut the pipe, the holder is moved to a position where the edges of the first and second blades overlap and puncture the pipe. Sliding guide rails carry the boom, holder and first and second blades together in the direction of the pipe, so that first and second blades cut the pipe perpendicularly to the pipe axis as the pipe rotates between the overlapping edges of the blade.

The cutting blades of the present invention use a shearing action, like scissors, to cut the pipe. The pipe is cut without the sparks, noise and danger of a high-speed saw blade. Thus, the present invention provides a safer environment for manufacturing spiral seamed pipes. Further, the cutting process of the present invention does not leave burrs on the ends of the cut pipe sections. This increases the efficiency of the pipe forming process because manpower does not have to be utilized to deburr the cut pipes. Still further, the cutting apparatus of the present invention may be easily adapted to existing spiral pipe producing machines.

The invention itself, together with further objects and attendant advantages, will best be understood by reference to the following detailed description taken in conjunction with the drawings.

BRIEF DESCRIPTION OF THE DRAWINGS

FIG. 12 is a perspective view of the boom which holds the upper cutting blade.

FIG. 12a is a sectional view taken along lines 12a—12a of FIG. 12.

FIG. 12b is a sectional view taken along lines 12b—12b of FIG. 12a.

FIG. 13 is a front elevational view of the wiper assembly used with the preferred embodiment of the present invention.

FIG. 14 is plan view of the control panel of a spiral pipe producing machine incorporating the present invention.

FIG. 20 is a sectional view taken through lines 20—20 of FIG. 17.

FIG. 20a is a sectional view taken through lines 20a—20a of FIG. 20.

FIG. 20b is a sectional view taken through lines 20b—20b of FIG. 20a.

FIG. 20c is a sectional view taken through lines 20c—20c of FIG. 20.

FIG. 20d is a sectional view taken through lines 20d—20d of FIG. 20c.

FIG. 20e is a sectional view taken through lines 20e—20e of FIG. 20.

DETAILED DESCRIPTION OF A PREFERRED EMBODIMENT

Figure 1:
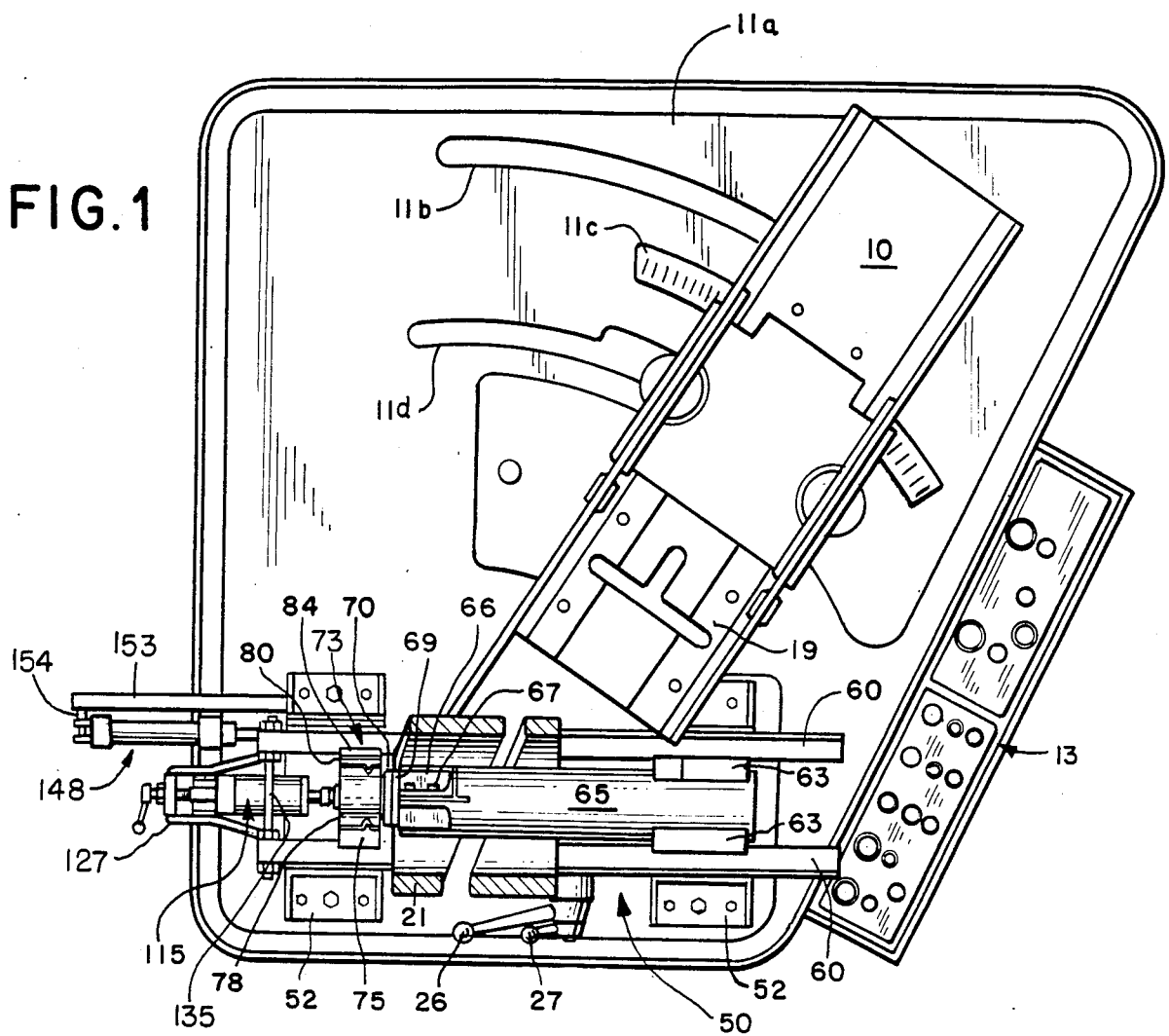
FIG. 1 is a plan view of the present invention as implemented on a spiral pipe producing machine.
Figure 2:
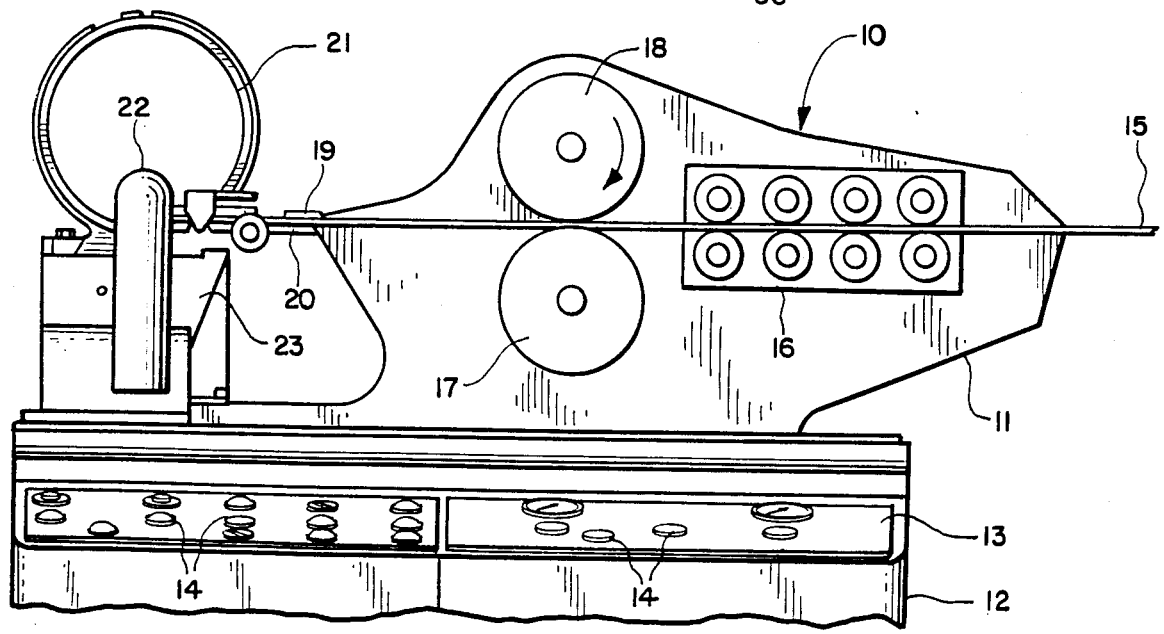
FIG. 2 is a side elevational view of a spiral pipe producing machine to be used with the preferred embodiment of the present invention.
Figure 3:
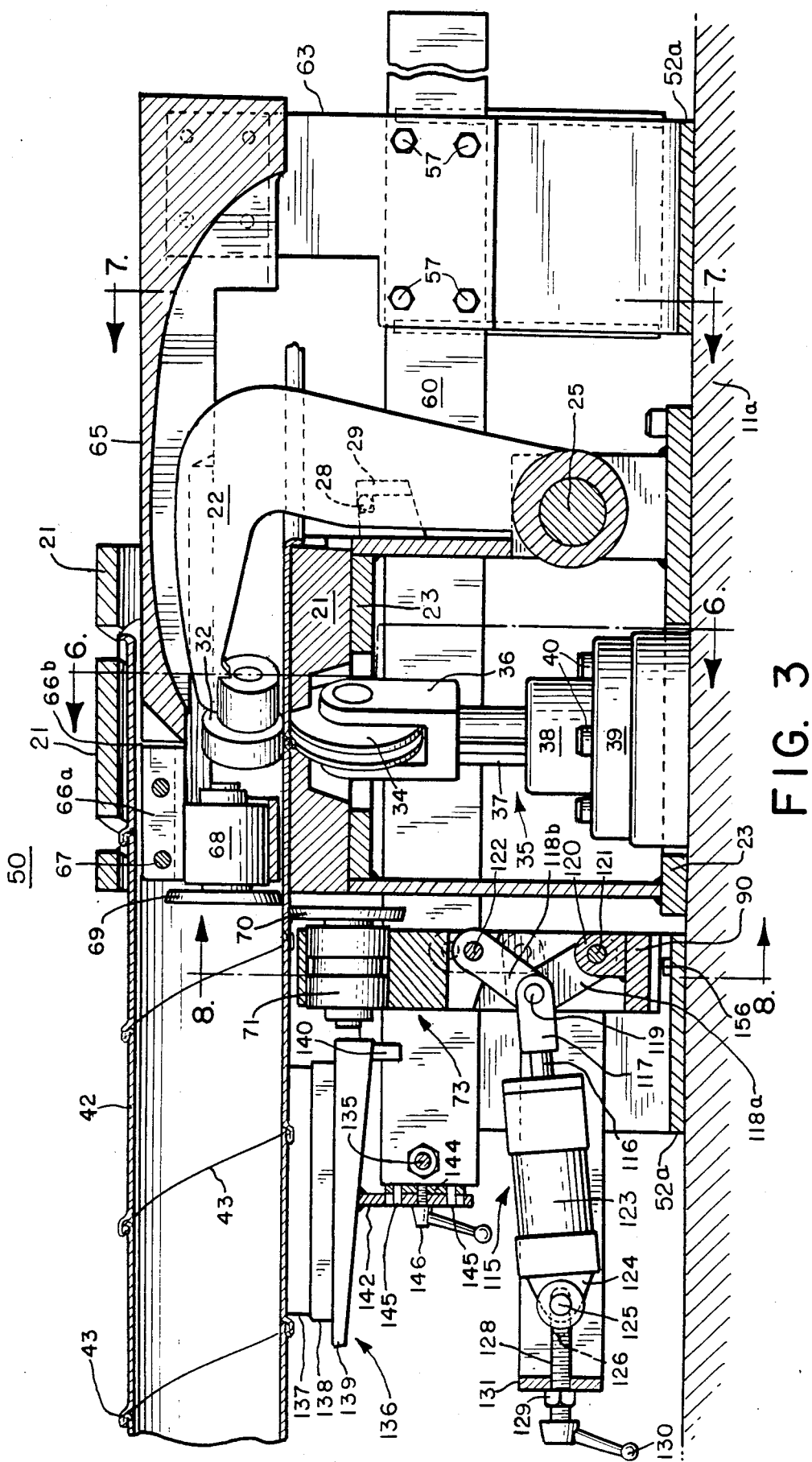
FIG. 3 shows the preferred embodiment of the present invention and part of the spiral pipe producing machine in elevation and section.
Figure 4:
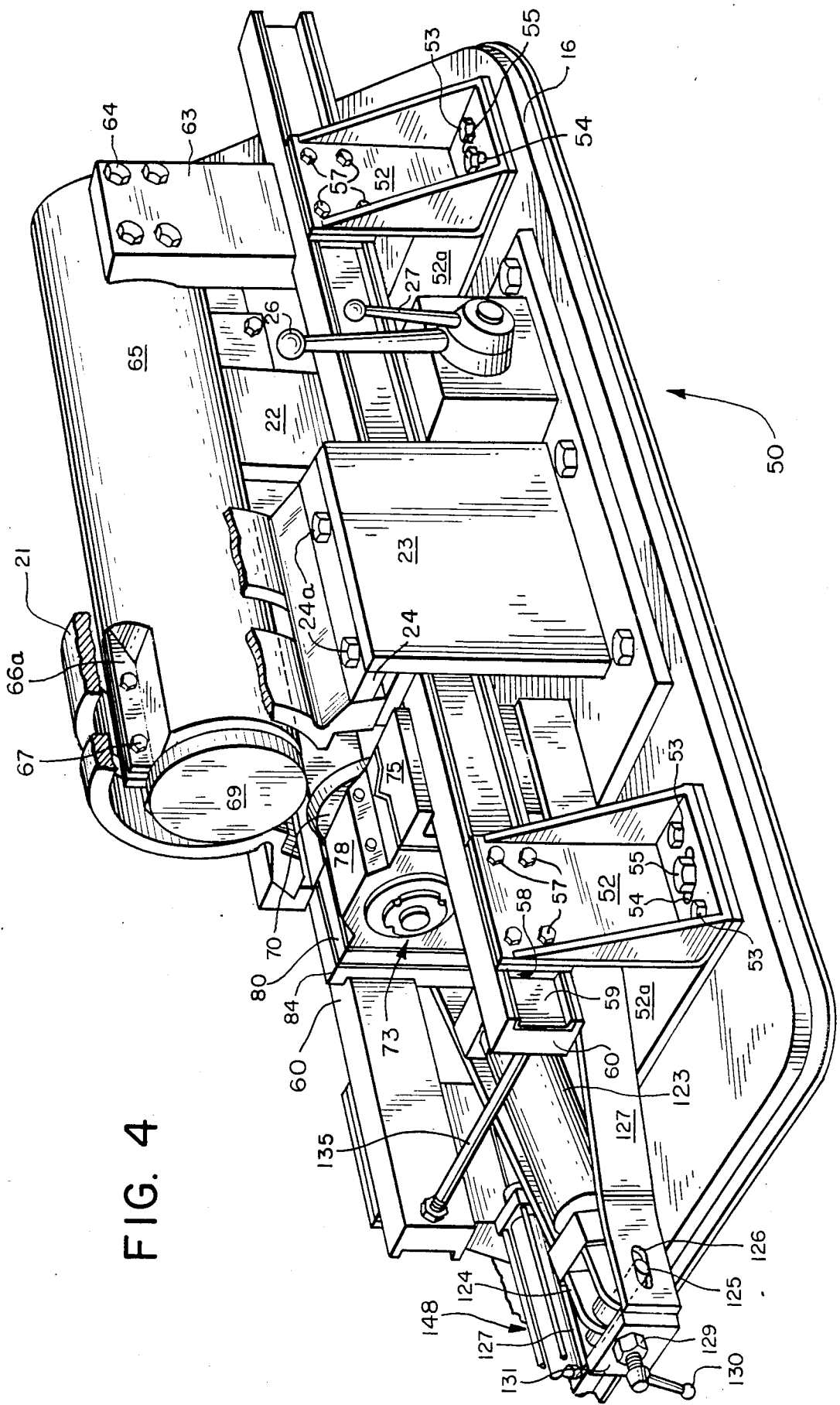
FIG. 4 is a perspective view of the preferred embodiment of the present invention.

Referring now to the drawings, FIGS. 1-3 show elements of a spiral pipe forming machine 10 which is used with the slitter assembly 50 of the present invention. The present invention illustrated and shown herein is implemented with a spiral pipe producing machine of the assignee of this invention. A particular type of such machine is described in my commonly owned U.S. Pat. No. 4,567,742, issued Feb. 4, 1986. It should be understood, however, that the present invention is intended to be used with any type of spiral pipe producing machine.

The spiral pipe producing machine shown in FIGS. 1-3 herein will be briefly described. For a more detailed explanation of spiral pipe producing machines, reference should be made to U.S. Pat. No. 4,567,742 particularly with respect to FIGS. 1, 2, 6 and 7, or U.S. Pat. No. 3,132,616 (Hale). These patents are incorporated by reference herein and made a part hereof for their descriptions of spiral pipe producing machines.

The spiral pipe producing machine 10 has a frame 11 which rests on a base 11a. Guide slot 11b is provided in the base 11a to adjust the angular orientation of the machine frame 11 with respect to the forming head 21 to determine the diameter of the pipe 42 produced by the machine. A scale 11c is provided to indicate the angular orientation of the machine. Guide slot 11d provides adjustment for the lower drive roller 17.

A control cabinet 12 is connected to the frame 11. A plurality of control knobs, gauges, and dials 14 are located on the control panel 13 for controlling and monitoring the operation of the machine 10 and the slitter assembly 50. The functions of the various control switches will be described in detail below in connection with FIG. 14.

A roller housing 16 is mounted in the frame 11. The roller housing contains a plurality of rollers which bend the edges of the metal strip 15 in predetermined shapes for forming a lockseam, and which may form corrugation grooves and stiffening ribs in the metal strip. An upper drive roller 18 and a lower drive roller 17 are rotatably mounted within the frame 11 adjacent the roller housing 16. The upper drive roller 18 pulls the metal strip 15 into the frame 11, through the roller housing 16, and over the lower drive roller 17. The drive rollers then cooperate to push the metal strip 15 between the upper guide plates 19 and the lower guide plates 20 into the forming head 21.

The forming head 21 curls the metal strip into a cylindrical spiral, whereby the opposing, preformed edges of the strip 15 mesh. The meshed or mated edges are then compressed between a support roller 32 and a clinching roller 34 to form a lockseam 43. The metal strip 15 is continuously pushed by the drive rollers 17, 18 through the forming head 21 and between the clinching roller 34 and support roller 32, in a spiral manner, so that a hollow, cylindrical metal pipe 42 is continuously produced with a spiral lockseam 43.

The support roller 32 is mounted on the upper guide plate 19. A support arm 22 pushes down on the support roller 32 and holds it in place. This support arm 22 has a thinner cross-section than the support arms that have been previously used in the assignee's spiral pipe producing machines. A thinner support arm is preferred because it can fit within the tight confines of the slitter assembly 50. The support arm 22 rotates about an eccentric shaft 25, so that it comes over the holding arm 33 and then clamps down the support roller 32. A locking pin 28 on the support arm fits within a lip 29 attached to the forming head base 23 when the support arm 22 is in its clamping position. The eccentric shaft 25 also allows the support arm 22 to swing clear of the forming head 21 when the support arm is not in its clamping position. A control lever 26 is used to rotate the support arm 22 about its eccentric axis 25, and controls the pressure applied to the support roller 32. The locking lever 27 releases or locks the control lever 26.

Figure 6:
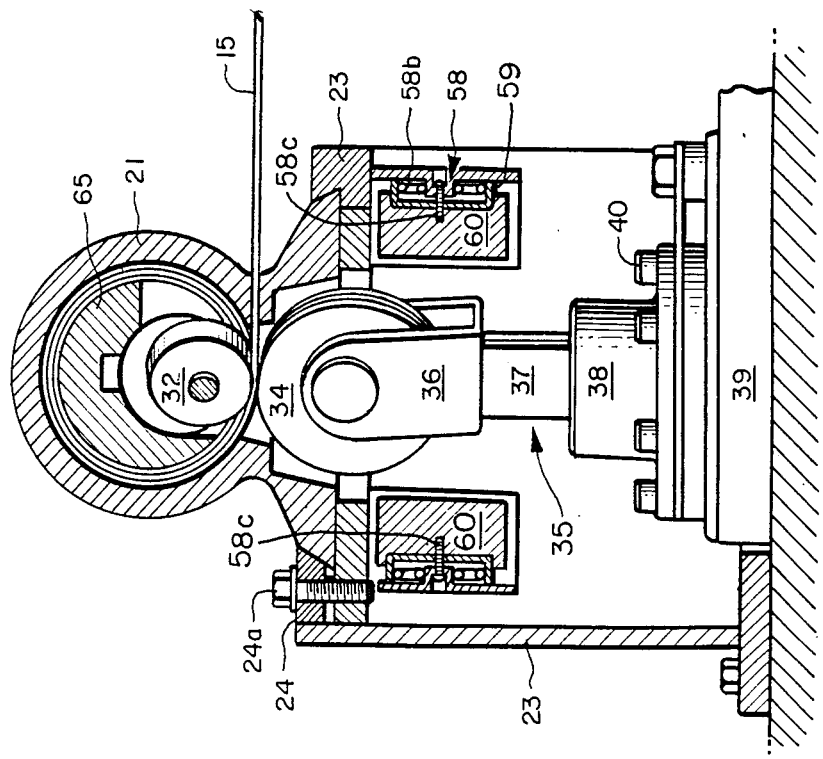
FIG. 6 is a sectional view taken along lines 6—6 of FIG. 3.

The clincing roller 34 is moved into and out of its clinching position by a conventional hydraulic cylinder assembly 35, which operates in a known manner. The cylinder assembly 35, as shown in FIGS. 3 and 6, includes a yoke 36 which holds the clinching roller 34. The yoke is appended to a piston rod 37, which slides in and out of the cylinder head 38. The cylinder head 38 is attached to the cylinder barrel 39 by bolts 40. The hydraulic cylinder assembly 35 provides the pressure on the clinching roller 34 to close the lockseam 43.

The forming head 21 is secured to the forming head base 23 by the key 24 and bolts 24a. The key 24 allows the forming head to be easily removed. Different size forming heads can be used with the same spiral pipe producing machine 10 to produce spiral seamed pipe of various diameters.

The slitter assembly 50 is preferably mounted to the machine base 11a. In some instances, however, it may be easier to mount the slitter assembly 50 on an adapter plate which is fastened to the machine base.

The slitter assembly 50 includes two pairs of base legs 52. Each opposing pair of base legs 52 is fixed to a plate 52a with bolts 53. The pair of base legs 52 and plate 52a form one solid piece. It is important that opposing base legs are separated by a precise distance and maintain a precise alignment, so that they do not put pressure on the bearing units 58 (described below). Each base leg 52 is secured to the machine base 11a via bolts 55. These bolts 55 are located within adjustment slots 54. Each base leg 52 is provided with one adjustment slot 54. The four adjustment slots 54 are at right angles to a pivot pin 156. The adjustment slots 54 allow the slitter assembly 50 to be rotated about the pivot pin 156 to align the slitter assembly. Proper angular alignment is necessary to obtain clean, rectangular cuts of the pipe 42.

A linear-motion bearing unit 58 and rail 59 combination is attached to the upper, inner face of each base leg 52. The linear-motion bearing unit 58 and rail 59 combination used in the present embodiment of the invention is a Slide Pack FBW Series, sold by THK America, Inc., Elk Grove Village, Ill. The bearing unit 58 includes a mounting plate 58a which is fastened to the base leg 52 by bolts 57. Two ball bearing circuits 58b are located on each mounting plate. The rail 59 mates with ball bearing circuits 58 on two juxtaposed base legs 52, and slides across the ball bearings with very little resistance. A linear guide beam 60 is attached to each rail 59 with screws 58c. Thus, the linear guide beams 60 will slide relative to the base legs 52 with very little friction.

Two vertical connecting members 63 are fastened to one end of the linear guide beams 60 with threaded bolts 62. The vertical connecting members 63 support the back end of a cantilevered boom 65. The generally cylindrical shaped boom 65 is provided with two recessed, flat surfaces to mate with the vertical connecting members 63. A plurality of bolts 64 fasten the vertical connecting members 63 to the back end of the boom. Note that one of the vertical connecting members 63 is L-shaped to provide more clearance for the upper and lower guide plates 19, 20.

The diameter of the boom 65 is small enough so that the boom can move laterally through the forming head 21. It is presently preferred that the boom diameter is small enough so that the boom can pass through a four inch diameter pipe. The boom 65 can then be used for any larger diameter pipe as well.

It can be seen from FIGS. 3, 5-7, 12a and 12b that the central section of the boom 65 is carved out to varying depths. This is done to allow the boom 65 to pass over the support roller 32, and to provide sufficient clearance for the support arm 22 to move into and out of its clamping position with the support roller 32. Trade-offs must be made in the amount of clearance provided for the support roller and support arm, and the amount of material left in the boom to keep it rigid. In a present embodiment of the invention the boom 65 is only ⅜ inch thick at its thinnest point.

The front end of the boom 65 is provided with a receptacle 66. The cavity defined by the receptacle holds the upper knife housing 68. The sides of the receptacle can be pried apart to allow the uper knife housing 68 to slide into the receptacle cavity. A slit 66b is provided in the receptacle 66 to facilitate opening the receptacle. The shoulders 66a of the receptacle are pulled together by bolts 67 to lock the upper knife housing 68 into the receptacle 66.

A circular, passive knife blade 69 is rotatably mounted in the upper knife blade housing 68. The terms "passive" or "idle" means that the blade may move in response to a tangential force against the cutting edge of the blade, as opposed to actively driving the blade with a motor. The upper knife blade 69 fits within the forming head 21 and the pipe 42. It is preferred that the circumference of the blade is small enough so that it also may fit within four inch diameter pipe. The boom 65 and upper blade 69 are positioned inside the pipe 42 so that their axes are parallel to the the axis of the pipe. The circumferential edge of the blade provides the cutting action. The edge should be located adjacent to the inner pipe surface. It is preferred that the blade edge is almost touching the pipe surface. In the present embodiment of the invention 1/16 inch clearance is used. The edge should not actually touch the pipe, so that it scratches the inner pipe surface and dulls the cutting edge. On the other hand, if the cutting edge is too far above the pipe surface, the pipe will bend towards the upper blade during the cutting process, leaving a wrinkled pipe edge.

A second circular, passive knife blade 70 is positioned outside of the pipe. The blade is rotatably mounted in a lower knife housing 71, which is mounted on a lower knife guide assembly 73. The lower knife guide assembly 73 and lower knife guide housing 71 should position the lower knife blade 70 so that its axis is parallel to the pipe axis and the axis of the upper knife blade 69. The circumferential cutting edge of the lower blade 70 should be adjacent to the the circumferential edge of the upper blade 69 in a lateral position. In the preferred embodiment, the cutting edges of the upper and lower blades are separated by 0.002"-0.004" in the lateral direction. Ideally, the lateral clearance between the upper and lower knife blades should be 2-5% of the gauge of the metal strip 15. There should be a little clearance between the knife blades to allow the strip material to move to facilitate cutting. However, if the blades are positioned too far apart laterally, the cut will leave burrs and sharp edges on the pipe edge. On the other hand, if the blades are too close together laterally, additional force is required to cut the pipe.

The lower blade 70 should be displaced longitudinally from the upper blade 69, so that it is free and clear of the pipe 42 and the cutting edge of the upper blade 69 when no cutting is required. The lower blade 70 is then raised in a vertical direction to penetrate the pipe and initiate the cutting process (to be explained below).

The lower knife guide assembly 73 guides the vertical motion of the lower knife blade 70. (See FIGS. 8-10) This assembly includes a first guide leg 75 which is secured to a linear guide beam 60 with screws 77. Holes 77a are provided in the first leg 75 for the screws 77. A second leg 84 is attached to the other linear guide beam 60 with more screws 77 and screw holes 77a. An intermediate leg 80 is connected to the second leg 84 with bolts 85. These three legs are made of heat treated steel, hardened to 58-60 Rockwell. Both the first leg 75 and the intermediate leg 80 have integral v-shaped tongues 81 facing towards each other. A center section 78, with v-shaped slots 79, is adapted to slide up and down on the v-shaped tongues 81. Linear v-shaped needle bearing strips 87, sold by IKO Bearings, Arlington Heights, IL, are placed between the v-shaped slots 79 and the v-shaped tongues 81 to allow the center section 78 to move with little frictional resistance. A retaining lip is attached to the top and bottom of the v-shaped slots 79 to keep the bearing strips 87 in place. Four hex screws 88 are threaded into holes in the second leg 84. The ends of these screws 88 engage the surface of the intermediate leg 80 to apply pressure on the bearing strips 87 between the center section 78 and its two adjacent legs 75 and 80. Tie-bar 135, which maintains a precise distance between the linear guide beams 60, also puts force on the bearing strips 87. The pressure on the bearing strips 87 should be adjusted with the hex screws 88, so that there is no play in the lower cutting blade 70, either up-and-down or side-to-side. Play in the cutting blade 20 will leave burrs and/or bad cuts. The bottom ends of the first leg 75 and the second leg 84 are tied together with a strut 90 and bolts 91.

The lower knife housing 71 is placed in a circular cavity 93 in the center section 78 of the lower knife guide assembly 73. The lower knife 70 has an integral shaft 96 which is positioned along the central axis of the cavity 93 of the housing 71. The blade shaft 96 is held in position by a plurality of inner bearing races 98, conical bearings 99, and outer bearing races 97. The conical bearings allow the blade 70 to freely rotate when a tangential force is applied to the circumference of the blade 70. Seeger security rings 100 provide support for the outer races 97. The voids between the conical bearings and their races are filled with grease. Seals 101 are provided at the front and back ends of the housing cavity to keep out dirt and dust. A nut 105, which is threaded on the rear of the blade shaft 96, is turned to adjust the pressure on the bearings 99. The blade 70 should be allowed to freely rotate without any play. A lockwasher 104 is provided to prevent the nut 105 from loosening. A filler ring 103 matches the inner diameter of the back seal 101 and provides support for the back inner races 98.

Figure 9:
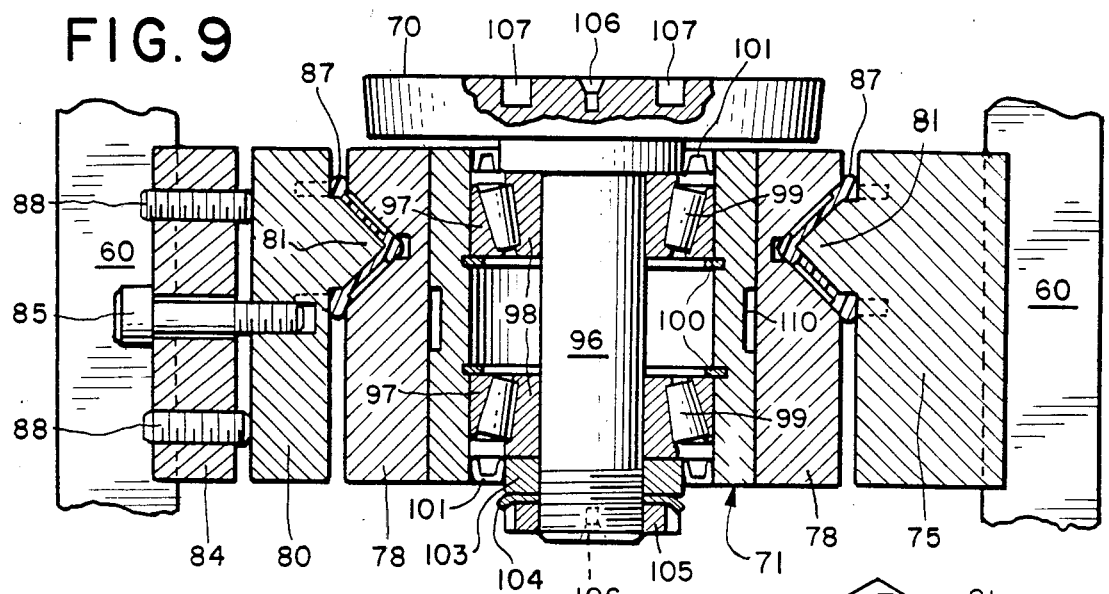
FIG. 9 is a sectional view taken along lines 9—9 of FIG. 8.
Figure 10:
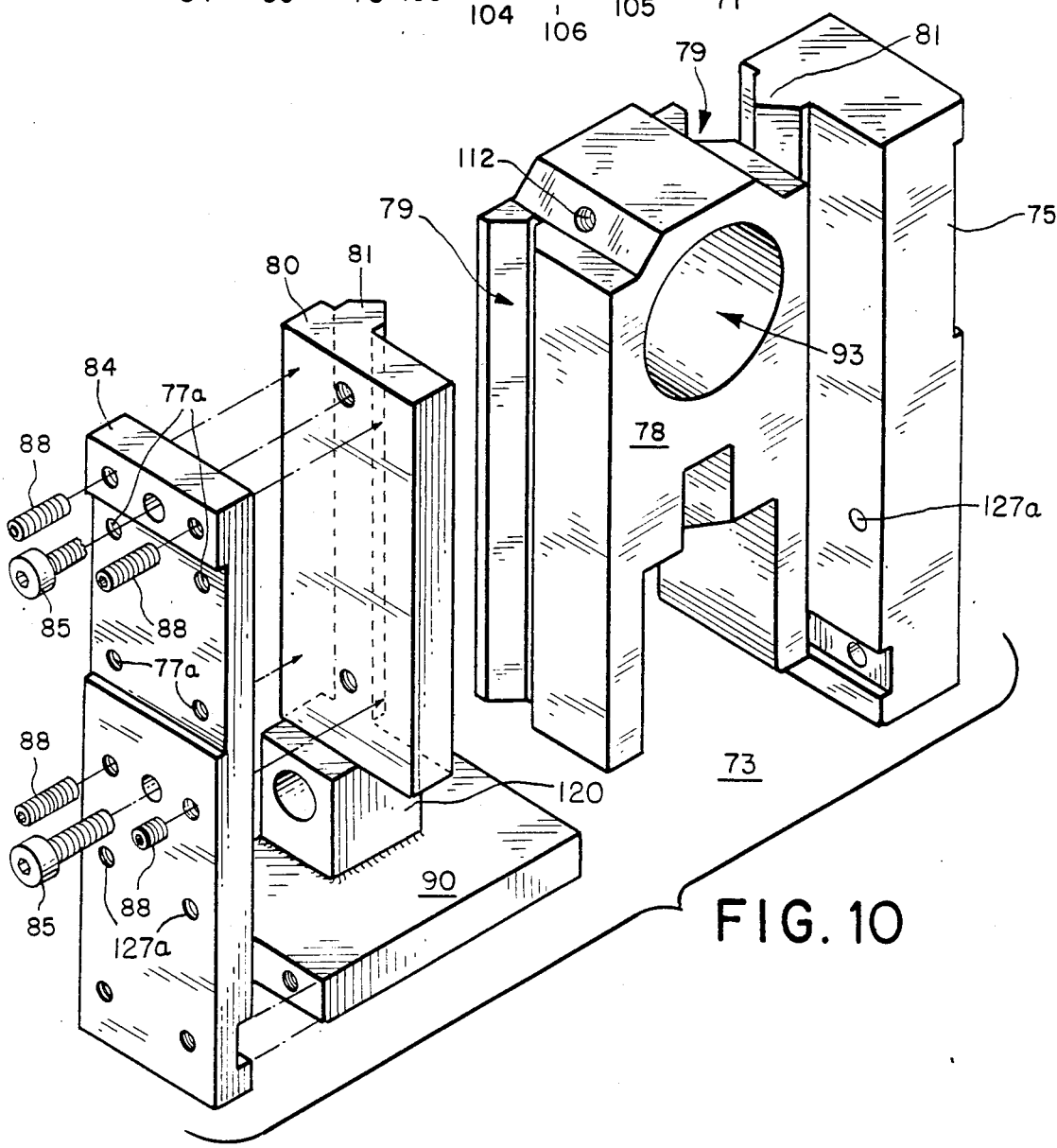
FIG. 10 is an exploded view of the lower knife guide assembly.

As shown best in FIG. 9, the circular face of the lower knife blade 70 is machined so that its circumferential edge is slightly angled. The circumferential edge should be sharp since it provides the cutting action. The bores 106 in the axial ends of the cutting blade 70 are used to hold the blade while it is being ground, so that the blade shaft 96 and the cutting edge of the blade are perfectly perpendicular and straight. This is done so that the blade does not wobble. Wrench holes 107 are provided in the face of the blade 70 to hold the blade steady while the nut 105 is tightened.

Figure 8:
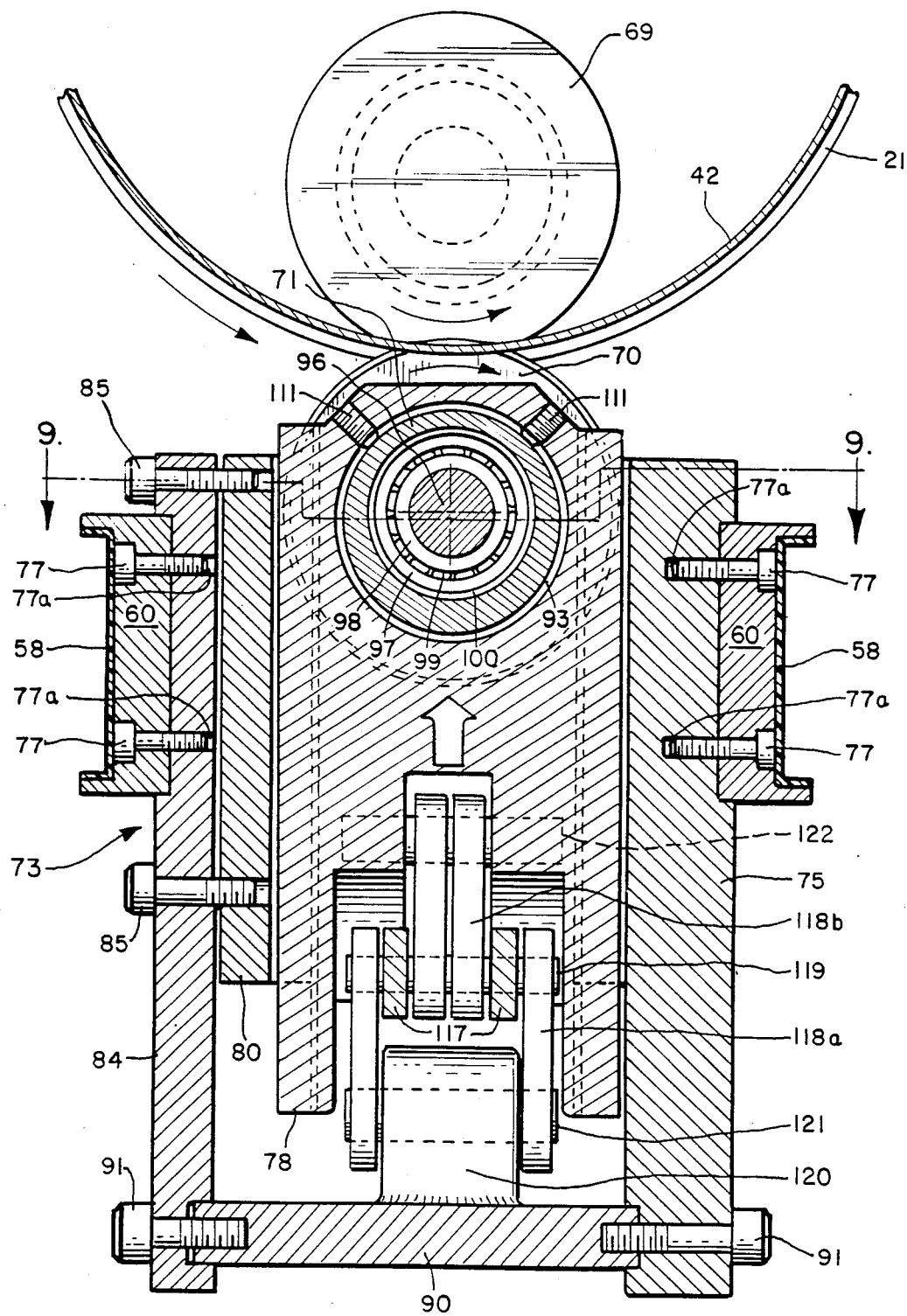
FIG. 8 is a sectional view taken along lines 8—8 of FIG. 3.

The lower knife housing 71 is eccentrically shaped, as best shown in FIG. 8. The knife housing 71 is rotated in the cavity 93 in the center section 78 to adjust the vertical distance between the cutting edge of the lower knife blade 70 and the top of the center section 78. The lower knife housing 71 may also be slid laterally within the cavity 93 to adjust the lateral distance between the cutting edges of the knife in position. The bolts 111 are threaded through the holes 112 in the center section 78 and engage the annular recess 110 in the lower knife housing 71.

The upper knife housing 68 and upper knife blade 69 are identical to the lower knife housing 71 and lower knife blade 70. These parts are intended to be interchangeable. The upper knife blade housing 68 is positioned in the receptacle 66 on the front end of the boom 65. The eccentric knife housing 68 is rotated within the receptacle to adjust the vertical distance between the cutting edge of the upper knife blade 69 and the bottom of the boom 65. Thus, the distance between the edge of the blade and the inner pipe surface is controlled by the eccentric housing 68. Moreover, the lateral distance between the cutting edges of the knife blades 69, 70 can be adjusted by sliding the upper knife housing 68 laterally within the receptacle 70. The upper knife housing 68 is locked into its desired angular and lateral positions by tightening bolts 67 to pull the shoulders 66a together. (The annular recess 110 is not used for the upper knife blade assembly.)

The center section 78 of the lower knife guide assembly 73, and hence the lower cutting blade 70, are moved vertically with the pneumatic toggle cylinder assembly 115. The present embodiment of the invention uses a two inch diameter, one inch stroke pneumatic cylinder sold by Milwaukee Cylinder Co. This toggle cylinder assembly includes two toggle links 118a,b which are pivotally joined by a central rod 119. The lower toggle link 118a is also pivotally joined to a projection 120, which is integral with the strut 90, via a lower rod 121. The upper link 118b is also pivotally connected to the center knife holder section 78 via an upper rod 122. A yoke 117 is connected to the central rod 119, which joins the two toggle links 118. The yoke 117 is appended to a piston rod 116 which slides in and out of the cylinder barrel 123. A rear yoke 124 is connected to the back end of the cylinder barrel 123. The cylinder barrel 123 is supported by a bar 125 which passes through the rear yoke 124 and slots 126 in two brackets 127. The brackets 127 are attached to the outer guide legs 75 and 84 of the lower knife guide assembly 73 at screw holes 127a (see FIG. 10). Thus, the toggle cylinder assembly 115 is adapted to move in unison with the linear guide beams 60 via the lower knife guide assembly 73.

The toggle cylinder assembly 115 operates under pneumatic pressure to move the lower knife blade 70 from its standby position to its cutting position. When the piston rod 116 is fully retracted, the uppermost edge of the lower knife blade 70 should be below the lowermost surface of the forming head 21. (See FIG. 3) The forming head 21 then can be slid in and out of the forming head base 23, so that the forming head may be changed. The lower knife blade 70 should be in its cutting position when the piston 116 is at the end of its stroke. The toggle links 118a,b then should be locked in vertical alignment. This vertical alignment makes it difficult for the cutting force on the lower knife blade 70 to push down the center knife holder section 78, thereby facilitating cutting of the lockseam, which comprises four layers of the metal strip 15.

Figure 11:
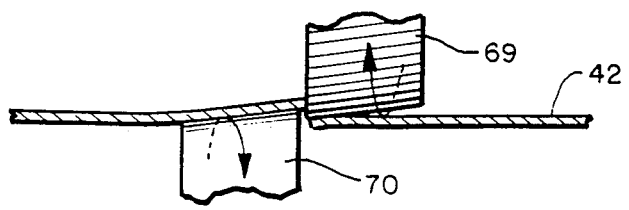
FIG. 11 is a sectional view of the cutting action of the upper and lower knife blades.

When the toggle cylinder assembly 115 moves the lower knife blade 70 into cutting position, the circumferential edge of the lower knife blade 70 should puncture the pipe surface and overlap with the circumferential edge of the upper knife blade 69 by approximately 1/32 of an inch (See FIG. 11). The amount of overlap may have to be increased so that the blades do not jump over the lockseam. However, if the blades overlap too much, the wedge of the cut pipe may wrinkle.

The toggle cylinder assembly 115 should be adjusted to provide the proper degree of blade overlap for cutting when the piston rod 116 is at full stroke and the links 118a,b are vertically aligned. This adjustment may be made with the adjustment lever 130. This lever has an integral threaded shaft 128 and ring 128a. The bar 125 passes through the ring 128a. The threaded shaft 128 passes through a nut 129 and an endpiece 131. The adjustment lever 130 is rotated to move the toggle cylinder assembly 115 in a horizontal direction along the adjustment slots 126 in the support brackets 127. The standby position and the cutting position of the upper toggle link 118b will vary in the vertical direction as the position of the cylinder barrel 123 is varied in the horizontal direction. The vertical standby and cutting positions of the lower knife blade 70 will vary accordingly. If the proper cutting position of the lower knife blade 70 can be achieved with the piston rod 116 at its end of stroke, operator adjustment (and mistakes) of cutting tolerances can be eliminated. Varying the gauge of the metal strip 15 usually will not require a new adjustment of the cylinder barrel position.

An air cylinder assembly 148 is provided to assist lateral movement of the upper and lower knife blades 69 and 70. A cylinder barrel 150 is attached at its back end to a strut 153 by a nut and bolt arrangement 154. The strut 153 is attached to a base leg 52 by two bolts. The piston rod 149 is connected to a support bracket 127 of the toggle cylinder assembly 115 with a clevis 151 and nut and bolt 152. The air cylinder assembly 148 operates to pull and push the bracket 127. Since the bracket 127 is connected to the linear guide beams 60 via the outer legs of the lower knife guide assembly 73, the air cylinder assembly 148 also pulls and pushes the linear guide beams 60 and everything connected thereto, including the upper and lower knife blades 69 and 70.

The air cylinder assembly 148 provides friction compression for the linear bearing units 58. The slitter assembly 50 weighs too much to be moved solely by the force of the moving strip 15 after the upper and lower knife blades 69, 70 cut the pipe 42. The air cylinder assembly 148 facilitates free movement of the cutting blades, and parts connected thereto, so that the pipe 42 will rotate through the cutting blades 69, 70 and be completely severed.

Figure 5:
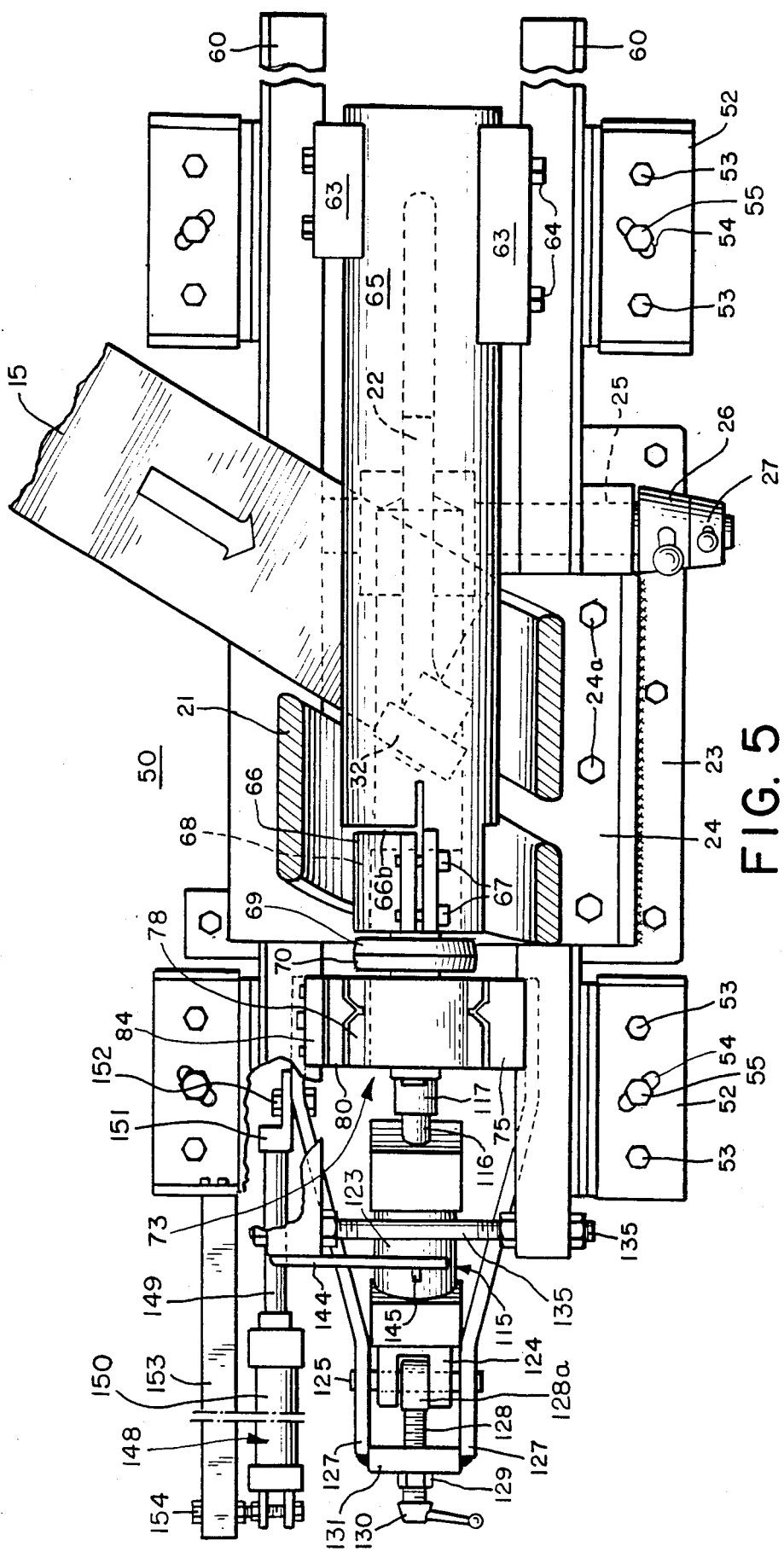
FIG. 5 is a plan view of the preferred embodiment of the present invention.
Figure 7:
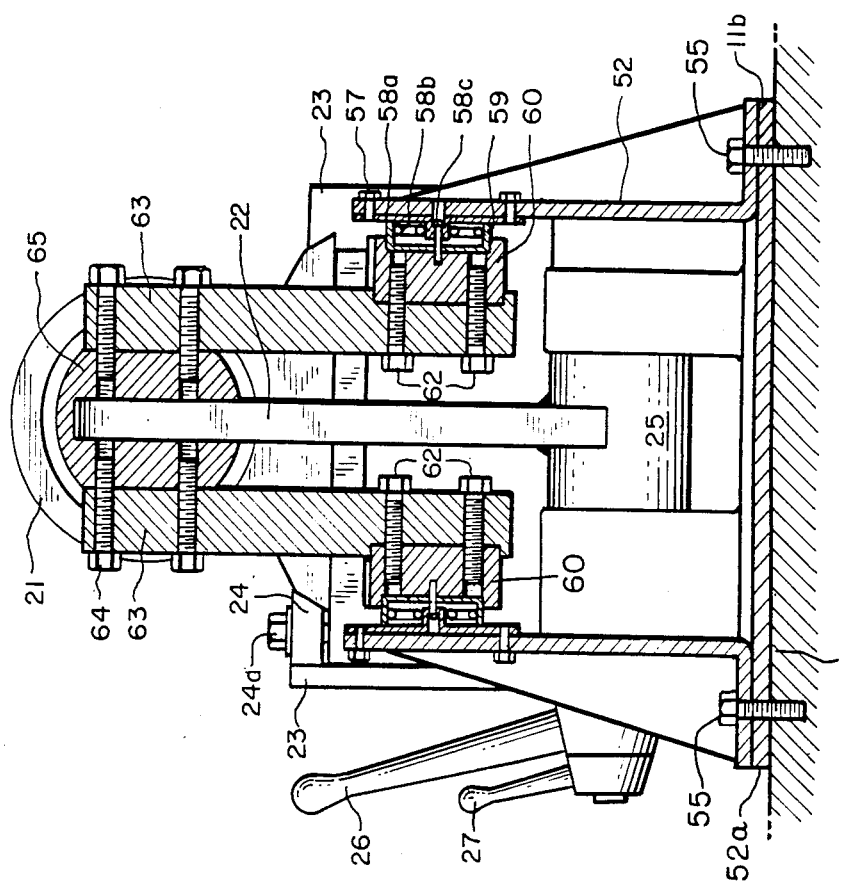
FIG. 7 is a sectional view taken along lines 7—7 of FIG. 3.

A wiper assembly 136 is provided to wipe lubricant off the pipe 42 (See FIGS. 3, 5, and 13). A rubber wiper blade 137 is attached to a wiper holder 138, which is positioned within a basin 139. Lubricant which is collected in the basin 139 runs off to drain via a hose (not shown) connected to the tube 140. The basin 139 is mounted on a vertical support member 142. The support member 142 is attached to the free end of a cantilevered beam 144. The other end of the beam 144 is attached to the end of a linear guide beam 60. Thus, the wiper assembly 136 moves with the linear guide beams 60. The free end of the cantilevered beam has three guide pins 145 in vertical alignment. The vertical support member 142 has a vertical slot which fits around the three guide pins 145. The vertical support member 142 and basin 139 can slide up and down over the guide pins 145, and the guide pins will keep the support member 142 and basin 139 in a vertical orientation. A handle 146 is threaded onto the central guide pin so that it can be turned to lock the vertical support member 142 against the beam 144 to maintain a constant height.

An advantage of this wiper assembly 136 is that the wiper blade 137 is positioned underneath the pipe 42. Thus, the wiper can wipe lubricant off any diameter pipe from the same position. Moreover, the wiper works with gravity to remove lubricant from the pipe.

The operation of the slitter assembly shown and described above will now be explained, with particular reference to FIGS. 14 and 15. With a few minor exceptions, the dials and switches 14 on the left-hand side of the control panel 13 perform the same functions they have performed in the assignee's spiral pipe producing machines which have been on the market for over one year. First, the cutter start and stop buttons have been replaced with slitter start and stop buttons. These buttons can be used to trim the leading edge of the pipe 42 using the slitter assembly 50. The LOW dial still controls the pipe speed during the slow down phase and cutting operation, although the cutting speed is not as dependent on strip thickness and pipe diameter. Second, the low speed override switch is no longer used.

The right-hand side of the control panel has been changed in light of the slitter assembly 50. The hydraulic gauge 14a is controlled by the dial 14f. When the dial 14f is at a first setting, the hydraulic gauge 14a will indicate the hydraulic pressure on the upper drive roller 18. In a second dial setting, the hydraulic gauge 14a displays the clinching roller 34 pressure. In a third setting the drive motor pressure is read, and in a fourth position the pump pressure is displayed. The drive roller hydraulic relief valve 14c controls the drive roller pressure, and the clinching roller hydraulic relief valve 14d controls the clinching roller pressure.

The pneumatic pressure gauge 14b displays the pressure on the friction compensating cylinder assembly 148. The pneumatic relief valve 14e adjusts the pneumatic pressure on the return stroke of the piston rod 149. (i.e., during the cutting process).

Figure 15:
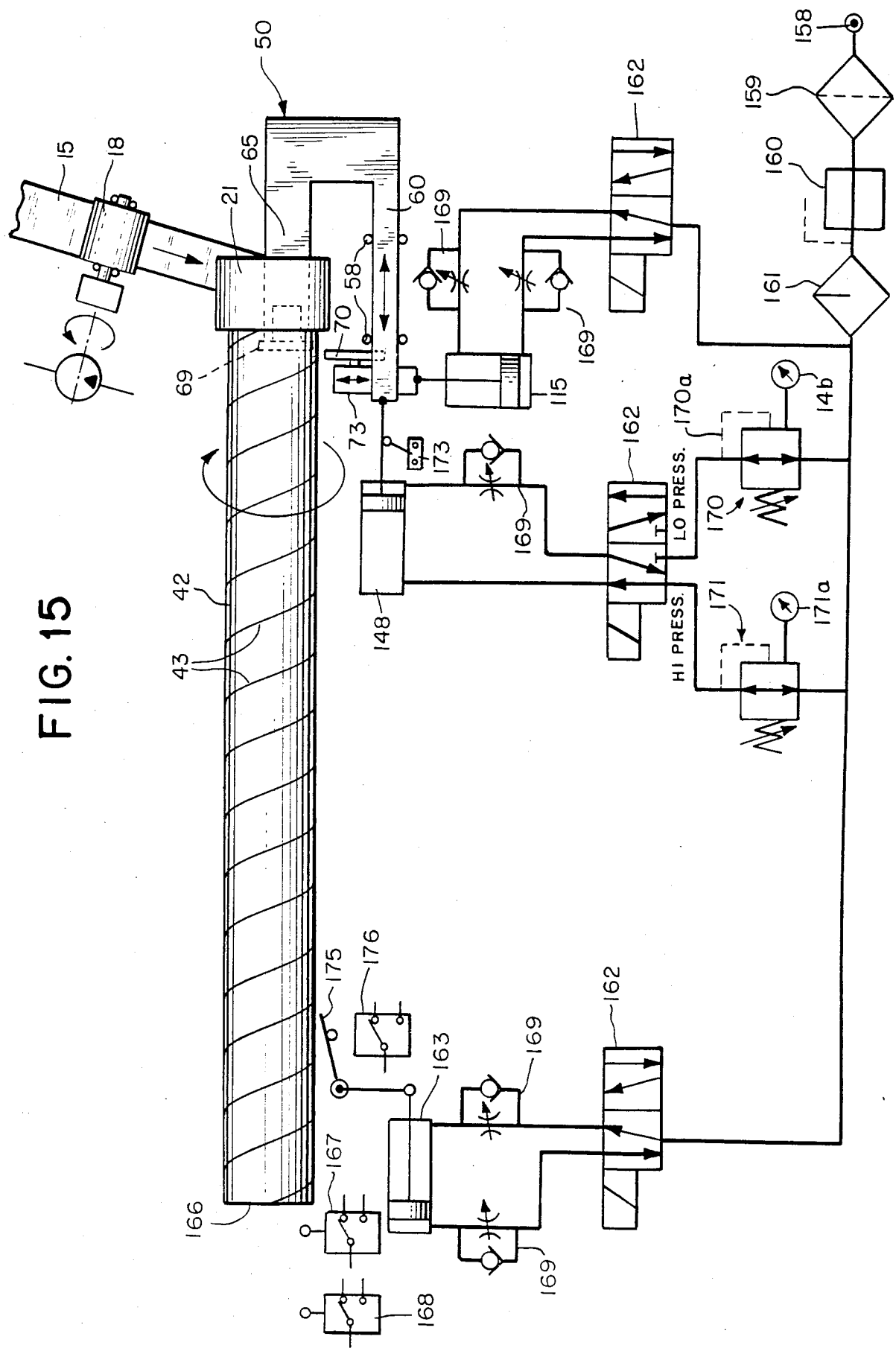
FIG. 15 is a schematic diagram of the pneumatic control system of the present invention.
Figure 16:
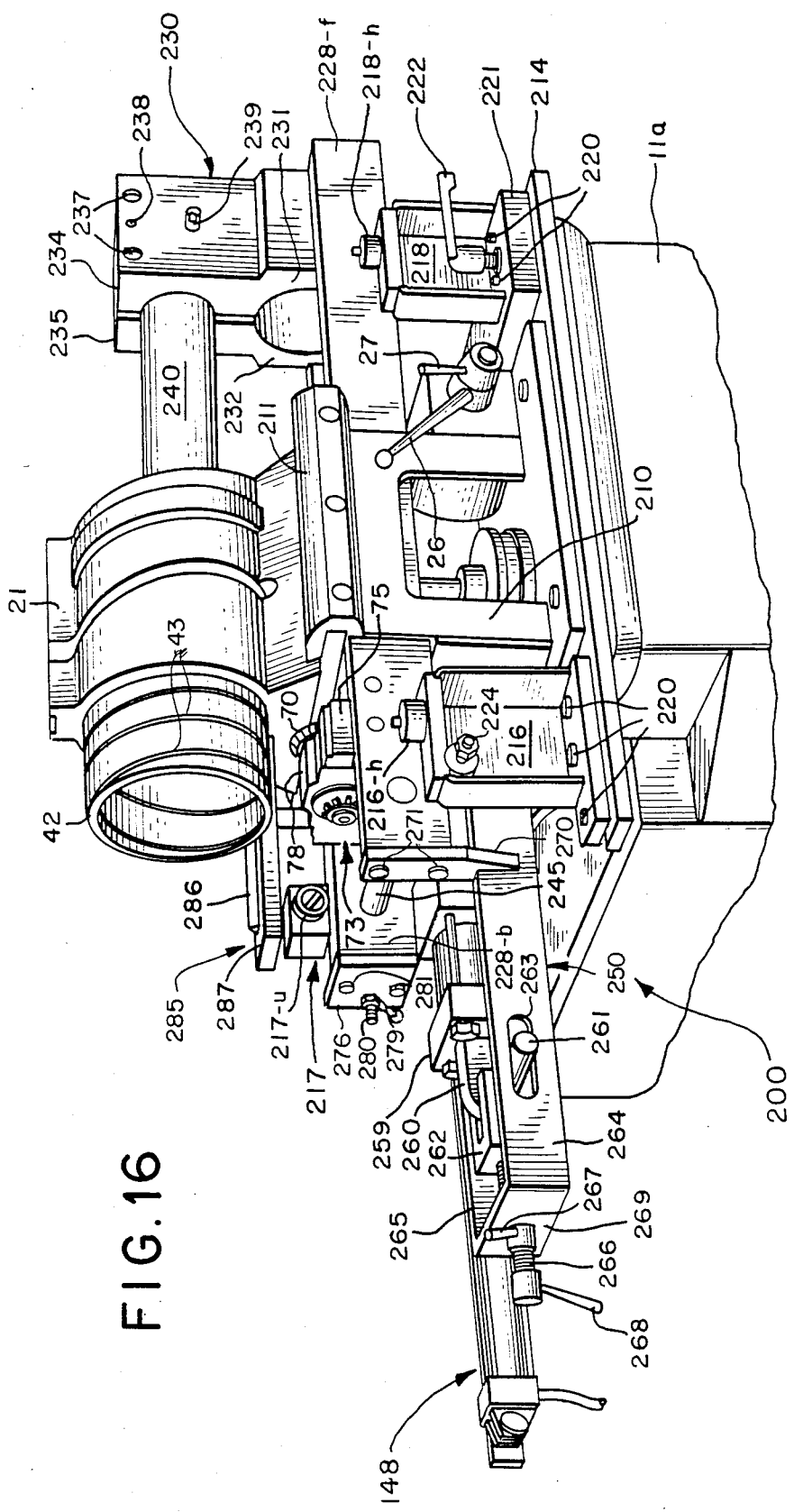
FIG. 16 is a perspective view of a second preferred embodiment of the present invention.

The schematic diagram for the pneumatic control system of the slitter assembly 50, shown in FIG. 15, contains several conventional items which perform in a known manner. For example, the source of air 158 is connected through a filter 159, a pressure regulator 160, and a lubricator 161. Directional valves 162 control the operation of the toggle link cylinder 115, the friction compensating cylinder 148, and a pipe discharge cylinder 163.

Spiral seamed pipe is made withe the pipe producing machine 10 in a known manner. The metal strip 15 can be fed into the machine 10 and formed into spiral seamed pipe in the manner set forth in U.S. Pat. No. 4,567,742. Once the metal strip has been inserted into the machine, the operator starts the mainmotor (oil pump) by pushing the MAIN button. Next, the LUBRICANT button is pushed to start the lubrication pump. The LOW speed selector is adjusted to set the cutting speed, and the HIGH speed selector is set to adjust the pipe production speed. The operator then selects either manual or automatic operation using the AUTO control knob. When the operator hits the HIGH in the automatic mode, the pipe producing machine 10 will continuously make pipe, and the slitter 50 will continuously cut it into sections. In manual mode the pipe producing machine 10 will continuously make the pipe, and the slitter will automatically cut the pipe into a section, but the pipe producing machine will turn off after the pipe section has been discharged. The present embodiment of the invention runs under a conventional programmable controller. Of course, switches and delay timers could be used instead.

Referring now to FIG. 15, as the metal strip 15 is formed into spiral seamed pipe 42, the pipe 42 spirally rotates and moves forward laterally. When the outer edge 166 of the pipe hits a first limit switch 167, the upper drive roller 18 slows down. Hence, the pipe 42 moves more slowly. When the pipe 42 next hits the second limit switch 168, the pipe producing machine turns the upper drive roller off, and the pipe 42 stops moving. Air is then supplied to the toggle link cylinder 115 to raise the lower knife blade 70. The lower knife blade is raised until its circumferential edge overlaps the circumferential edge of the upper knife blade and punctures the pipe 42. Restricted orifices and check valves 169 are provided on the inlet and outlet lines of the toggle cylinder assembly 115, so the lower knife guide assembly 73 does not rise or fall too fast.

After a 1-2 second delay, the upper drive roller 18 starts again on slow speed, and the friction compensating cylinder 148 reverses direction. Thus, the pipe 42 starts moving forward and spirally rotating again. However, the pipe 42 will rotate between the overlapping upper and lower knife blades 69, 70. The rotating pipe turns the overlapping knife blades 69, 70 so that they cooperate to cut the pipe as it rotates. The knife blades 69 and 70, and the components of the slitter assembly attached thereto (e.g., the boom 65, the lower knife guide assembly 73, the linear guide beams 60, and the toggle link cylinder assembly 115) will move in the direction of the pipe, due to the moving pipe pushing on the cutting blades and the pulling action of the friction compensation cylinder assembly 148. After one full rotation of the pipe 42, the pipe should be completely cut rectangularly (i.e., perpendicular to the axis of the pipe) by the upper and lower knife blades.

The friction compensating air cylinder 148 operates under low pressure on its return ("pull") stroke. This pressure is controlled by a pressure relief valve 170, which is adjusted using the pneumatic control knob 14e on the control panel 13. The dashed line 170a represents the relief line. The pulling pressure must be adjusted to compensate for any frictional resistance in the linear bearing units 58. The pressure in the cylinder 148 should balance the friction in the bearings so that the cutting blades 69,70 will move laterally at the touch of a finger. This pressure balance can be obtained by manually adjusting the cylinder pressure while pushing on the boom 65, or automatically with valves. The pressure compensating cylinder 148 allows the cutting blades and attached components to move with the pipe, as if there were no frictional resistance to such movement so that the cutting blades were moving only under the force of the moving pipe.

In order to achieve a clean, rectangular cut of the pipe, it is important that the cutting blades 69, 70, and all parts attached thereto, are properly aligned and moved as if there were no friction. It is also important that the cutting blades have the proper clearances and no play. If everything is not properly adjusted, the cut may not be rectangular. Instead, the cut could be spirally configured, so that the starting point and end point of the cut do not meet.

High pressure is used to return ("push") the pressure compensating cylinder 148 back to its starting position, since the extension stroke of piston rod 149 is not as sensitive. A pressure relief valve 171 is used to adjust this pressure. The relief valve 171 and pressure gauge 171a are located inside the control cabinet 12. A check valve and restricted orifice 169 are used to dampen the high pressure return.

The slitter assembly 50 continues to move with the pipe until the slitter assembly contacts a third limit switch 173. This limit switch is placed at a position at which any size (diameter) pipe made with the pipe producing machine 10 and slitter assembly 50 would complete one rotation, so that the cut will be complete. The limit switch 173 should actually provide for a little overlap in the cut. If the cut is not quite complete, two sections of pipe will be attached by a sliver of metal. Pipe ranging from 4 inch to 24 inch diameters will complete one rotation in approximately 5½ inches of lateral movement.

The pipe producing machine 10 then stops again. The toggle cylinder 115 is lowered to the standby position. After a short time delay the friction compensating cylinder 148 reverses direction, and returns the cutting blades 69, 70 to their starting position.

Next, the pipe discharge cylinder 163 raises arms 175 to discharge the cut section of pipe onto a run-off table. Check valves and restricted orifices 169 are provided so that the discharge arms 175 are raised and lowered slowly and gently. When the discharge arms 175 return they will close a fourth limit switch 176. The pipe producing machine 10 will not start again until this limit switch has been closed.

If the pipe producing machine 10 is in automatic mode and the fourth limit switch 176 closes, the machine 10 and slitter 50 will automatically repeat the above process for forming and slitting pipe. If in manual mode, the operator must hit the HIGH button to repeat the above process for one more section of pipe.

It follows from the foregoing description that the present invention provides several advantages over high speed saw blades for cutting hollow metal pipe. The cutting blades of the present invention use a shearing action, like scissors, to cut the pipe. The pipe is cut without the sparks, noise and danger of a high-speed saw blade. Thus, the present invention provides a safer environment for manufacturing spiral seamed pipes. Further, the cutting process of the present invention does not leave burrs on the ends of the cut pipe sections. This increases the efficiency of the pipe forming process because manpower does not have to be utilized to deburr the cut pipes. Still further, the cutting apparatus of the present invention may be easily adapted to existing spiral pipe producing machines.

FIGS. 16 through 23 show a new preferred embodiment of the present invention. In particular, these Figures illustrate a second slitter assembly 200. Many elements shown in these Figures are essentially the same as elements shown in FIGS. 1-15, and thus are given the same reference number used in FIGS. 1-15.

The slitter assembly 200 is designed to operate with the spiral tube forming machine 10 shown in FIGS. 1-3 and described above, and described in greater detail in U.S. Pat. No. 4,567,742. Like the first slitter assembly 50, described above, the second slitter assembly 200 can be readily adapted for use with other types of spiral tube forming machines that use an open forming head, which allows the slitter access into the pipe at the end at which it is formed. Of course, it is contemplated that the broad teachings of the present invention embodied in the second slitter assembly 200 may be applied to other types of spiral tube forming machines as well.

For the most part, the previous description of the spiral pipe producing machine 10 and its various components (i.e., with respect to FIGS. 1-7) is equally applicable here and, therefore, need not be repeated here. For example, the description above of the following parts is still applicable here: the roller housing 16, the drive rollers 17 and 18, and the guide plates 19 and 20;

the forming head 21; the support roller 32, its support arm 22, eccentric shaft 25, levers 26, 27, locking pin 28 and lip 29; and the clinching roller 34 and its cylinder assembly 35. The same is also true for other parts of the spiral tube forming machine 10 that are not individually listed here. Further explanation is not necessary for those skilled in the pertinent art to readily understand how the spiral tube forming machine 10 interfaces with the slitter assembly 200. (It should be noted, however, that FIG. 1 is slightly incorrect. The roller housing should not be so close to the slitter assembly 50, and the guide plates 19 and 20 should be narrower so they do not interfere with sliding elements of the slitter.)

A few parts of the spiral tube forming machine 10 have been slightly modified for the new slitter assembly 200. New clamp bars 211 and 212 are used to secured the forming head 21 to a slightly modified forming head base 210. The old key 24 was secured by bolts 24a to the top side of the forming head base. This design made it difficult to access the bolts 24a when a large diameter forming head 21 was to be used for making large diameter spiral pipe. In the new design the first clamp bar 211 is bolted to the side of the forming head base 210 with bolts 24a, and a second clamp bar 212 is bolted to the top of the forming head base 210. The first clamp bar 211 thus facilitates interchangeability of any size forming head 21.

Figure 17:
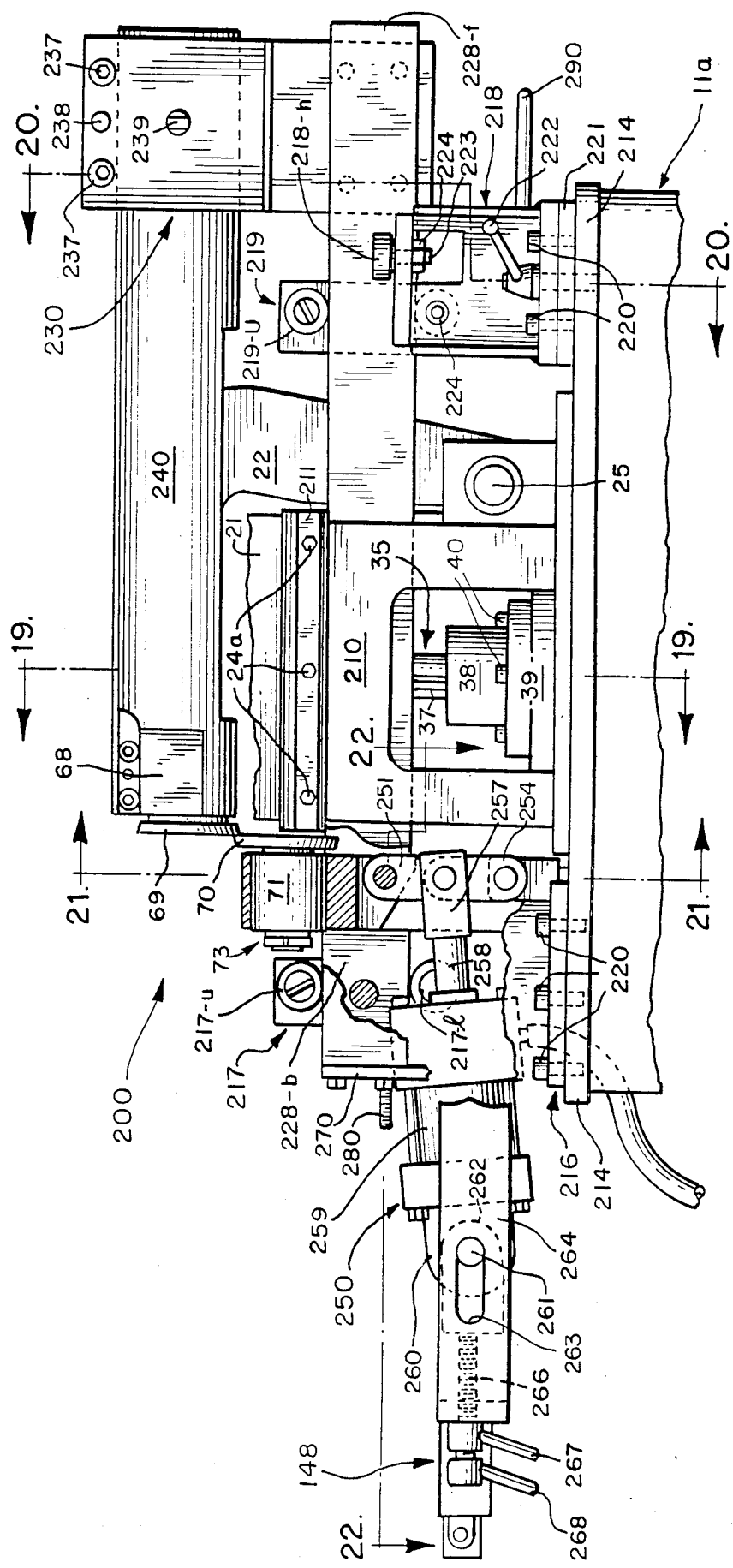
FIG. 17 shows the second preferred embodiment of the present invention partially in elevation and partially in section.

The length of the forming head base 210, as shown in FIG. 17, is slightly shorter (approximately ¼ inch) than that of the original forming head base 23. This change was made to prevent the lower cutting knife 70 from hitting the forming head base on its return to its starting position, and to facilitate adjustment of the starting position of the cutting knives 69 and 70 for the cutting process. When the knife blades 69, 70 first overlap, it is preferred that they puncture the pipe 42 just in front of the pipe's lockseam 43. The toggle cylinder assembly 115 or 250 is not always strong enough to push the lower knife blade 70 up and through the thick lockseam 43. Once the toggle cylinder links are locked into their vertical position, however, (see FIGS. 3 and 17), the toggle cylinder assembly is strong enough to maintain the knife blades in overlapping relationship while the pipe 42 rotates between the blades and cuts through the lockseam 43. Further, it is preferable to cut through the lockseam 43 close to the forming head base. If the lockseam is cut too far away from the forming head base, the pipe is more susceptible to wobble, which produces irregular cuts.

Turning now to the second slitter assembly 200, the slitter base plate 214 is preferably bolted to the spiral tube forming machine base 11a. In some instances, however, it may be necessary to mount the slitter assembly on an adapter plate which is fastened to the machine base. The left two base legs 216 and 217 are directly fastened to the base plate 214 with allen bolts 220. The right two base legs 218 and 219 are fastened to a base adjustment plate 221 with allen bolts 220. A threaded bolt and locking lever 222 releasably secures the right legs 218, 219, and their attached base adjustment plate 221, to the base plate 214.

Each of the base legs 216–219 is provided with a plurality of guide rollers. (See, e.g., FIGS. 16–18, 20) The left front leg 216 is provided with a lower, vertically disposed guide roller 216-$l$ and an upper, horizontally disposed guide roller 216-$h$. The right front leg 218 also is provided with a lower, vertically disposed guide roller 218-$l$ and an upper, horizontally disposed guide roller 218-$h$. The left back leg 217 is provided with a lower, vertically disposed guide roller 217-$l$, an upper, vertically disposed guide roller 217-$u$, and an upper, horizontally disposed guide roller 217-$h$. The right back leg 219 is provided with a lower, vertically disposed guide roller 219-$l$, an upper, vertically disposed guide roller 219-$u$, and an upper, horizontally disposed guide roller 219-$h$. The front base legs 216 and 218 are similarly constructed, and the back base legs 217 and 219 are similarly constructed.

Each guide roller consists of a steel ring which rotates around a plurality of needle bearings positioned around a shaft. The guide rollers used in the present embodiment of the slitter assembly 200 are standard cam follower rollers that are sold by several sources (e.g., IKO Bearings of Arlington Heights, IL or INA of Elk Groove Village, IL). A threaded end of the roller shaft 223 or 223-$e$ extends through a hole in a base leg 216–219, and is locked to the respective leg with a nut 224. All of the guide rollers on the back legs 217 and 219, i.e., guide rollers 217-$l$, 217-$h$, 217-$u$, 219-$l$, 219-$h$ and 219-$u$, are mounted in their respective legs on eccentric shafts 223-$e$, so that the position of these guide rollers may be adjusted by turning their shafts 223-$e$. On the other hand, all of the guide rollers on the front legs 216 and 218, i.e., rollers 216-$l$, 216-$h$, 218-$l$ and 218-$h$, are mounted on straight shafts 223 that are not intended for adjustment.

The guide roller arrangement of the slitter assembly 200 is designed to facilitate linear motion of the cutting knives 69 and 70, which are coupled to the linear guide beams 228-$f$ and 228-$r$ (collectively 228). Each base leg 216, 217, 218 and 219 has a lower guide roller 216-$l$, 217-$l$, 218-$l$ and 219-$l$, respectively, which supports the guide rails 228, and provides a rolling surface over which the rails 228 can move in a linear, axial direction. These lower guide rollers are preferably mounted on their respective base legs at the same height so that the rails 228 are in a level plane and the weight of the rails is distributed over all four lower rollers. (Note that the right base legs 218 and 219 are slightly shorter than their paired left base legs 216 and 217, since the right base legs are mounted on the base adjustment plate 221.) Of course, the height of the lower guide rollers on the back legs 217-$l$ and 219-$l$ can be adjusted through their eccentric shafts 223-$e$.

All four base legs 216–219 also include a horizontally disposed guide roller 216-$h$, 217-$h$, 218-$h$ and 219-$h$. The guide rails 228 slide between these horizontal rollers. The position of the horizontal rollers on the back legs 217-$h$ and 219-$h$ is adjusted through their eccentric shafts 223-$e$, so that the guide rails 228 do not move from side-to-side as they slide between the rollers. If there is any play during movement of the rails, it will be difficult to cut the pipe exactly the same each time. The four horizontal guide rollers 216-$h$, 217-$h$, 218-$h$, and 219-$h$ are preferably mounted at the same height. They are also mounted below the centerline of the guide rails 228 so that a clean track will be available if the front and back rails are interchanged.

The two back legs 217 and 219 each carry an upper, vertically disposed guide roller 217-$u$ and 219-$u$, respectively. The height of these two rollers is adjusted via their eccentric shafts 223-$e$ so that the back guide rail 228-$b$ moves between the back lower guide rollers 217-$l$, 219-$l$ and the back upper rollers 217-$u$, 219-$u$ without any vertical play. The upper guide rollers 217-$u$ and 219-$u$ are needed on the back base legs since the forces on this side of the slitter assembly can act both upwardly and downwardly during the cutting operation. Vertically disposed upper guide rollers are not required on the front base legs 216, 218, because all the forces acting on this side of the slitter are downward. However, heavier duty guide rollers are used on the front legs 216 and 218 since the rotation of the pipe pushes the slitter towards the front legs during cutting.

The guide roller system used in the second slitter assembly 200 provides several advantages over the linear bearing system used in the first slitter assembly 50. In practice it was found that the performance of the linear bearing units 58 and their complementary rails 59 was too easily degraded by dirt, metal chips, and the like. The guide roller system is not as sensitive to these common environmental elements. Further, the guides rollers do not wear as quickly as the linear bearing units 58 and their guide rails 59. And when the new guide rails 228 start to form wear tracks, the front guide rail 228-*f* and the back guide rail 228-*b* can be interchanged and used again. Still other advantages will be readily apparent to those skilled in the art.

The two guide rails 228 are separated at their left ends by a cold rolled spacer rod 245, which is bolted to the rails. At their right ends the guide rails 228 are separated by the legs 231 and 232 of the vertical boom holder 230. The boom holder legs 231 and 232 are fastened to the front and back guide rails 228-*f* and 228-*b*, respectively, with bolts 233. (See, e.g., FIG. 20) The opening between the two legs 231 and 232 provides clearance for the support arm 22.

The upper part of the boom holder 230 has a central cavity that accepts the cantilevered boom 240. This central cavity is defined by two arms 234 and 235 which are separated by a split opening 236. Two allen bolts 237 are provided to tie the arms 234, 235 of the boom holder together, thereby adjusting the diameter of the central opening and the width of the split opening 236. A set screw 238 is provided for pushing the arms 234 and 235 apart, thereby enlarging the split opening 236 and the central cavity, when the allen bolts 237 are loosened. An alignment pin 239 is inserted through the front arm 234 to maintain the boom 240 in a fixed orientation. The alignment pin 239 fits snugly in a corresponding hole in the boom 240.

The vertical boom holder 230 makes it much easier to remove the boom 240, especially if the pipe buckles during cutting and the the slitter gets jammed. To remove the boom 240, the alignment pin 239 is removed from the boom 240, the allen bolts 237 are loosened, and the set screw 238 is turned inwardly to separate the arms 234 and 235 of the boom holder 230. The boom 240 can then be slid out of the boom holder 230. Inserting a boom 240 into the boom holder 230 is equally easy. Specifically, turn the set screw 238 to separate the arms 234, 235, insert the boom 240 into the central cavity, insert the alignment pin 239 firmly into the boom 240, and tighten the allen bolts 237 until the arms 234 and 235 tightly grasp the boom.

The boom 240 shown in FIGS. 16–20 is very similar to the boom 65 describe above for use in the first slitter 50. Both of these booms 65 and 240 are designed to cut pipes having diameters four inches or larger. These booms 65 and 240 are also carved out similarly so that the boom will clear the support roller 32 and support arm 22 (although it has been learned that the thinnest part of the boom can be $\frac{1}{4}$ inch thick and still provide sufficient clearance). One difference is that the new boom 240 does not require flat surfaces to mate with the vertical connecting members 63.

The design of the new boom holder 230 and boom 240 facilitates the use of different size booms. The boom 240 shown in FIGS. 16–20 is approximately 3.5 inches in diameter, and fits into the boom holder 230 central cavity which is 3.5 inches in diameter. (The first slitter 50 was designed with a 3.5 inch boom 65.) The second slitter assembly 200 is also designed to work with a five inch diameter boom. The larger diameter boom is better suited for larger diameter pipe, i.e., six inches and up. A boom holder 230 having a larger central cavity, but identical in other respects, is used with the larger boom. (When using the heavier five inch boom, it would also be preferable, but not necessary, to make the back guide rail 228-*b*, the legs and center section of the lower knife guide assembly 73, and the diameter of the lower knife blade 70 wider.)

A $2\frac{1}{8}$ inch diameter boom can also be used with the second slitter assembly 200 for cutting smaller diameter pipe. In one embodiment this boom is 3.5 inches in diameter at its right end that connects to the boom holder 230 shown in FIGS. 16–20. The boom then narrows near its center to $2\frac{1}{8}$ inches in diameter. This smaller boom will work with pipe as small as $2\frac{3}{8}$ inches in diameter.

Whatever the boom diameter, the length of the boom 230 should be always be the same, so that the upper knife blade 69, at the left end of the boom, will always have the same lateral separation from the lower knife blade 70. In fact, one of the functions of the alignment pin 239 is to assure that the upper knife blade 69 is always in the same lateral position relative to the lower knife blade 70.

Of course, booms of different diameters will be carved to varying degrees. The smaller diameter boom, for example, is carved out less than the wider booms because it is used with a smaller support roller 32. On the other hand, a five inch diameter boom is used with a larger support roller 32 and support arm 22, and thus is carved out more. In fact, a five inch boom because necessary because there would not be enough material left in a 3.5 inch boom if it was carved out to clear the larger support roller. As mentioned above with respect to boom 65, the degree of carving out depends on the particular application. The important criteria is that the boom provides adequate clearance for the support arm 22 and support roller 32, the is still sufficiently strong.

The front end of the boom 240 is provided with a receptacle 66, which is the same as that described above for boom 65. (A set screw, similar to set screw 238, may be added to help separate the sides of the receptacle.) The receptacle 66 also holds the upper knife housing 68 in the same manner described above.

The upper knife blade 69 and lower knife blade 70 used with the second slitter assembly 200 are the same as that shown in FIG. 9 and described above. However, when the five inch boom is used for heavy duty applications, it is preferable to use a heavy duty upper knife blade 69 that is five inches in diameter and has a wider diameter shaft. When the smaller boom is used, a $2\frac{1}{4}$ inch upper knife blade 69, having a smaller shaft, is preferred. Except for changes in dimensions, the design and construction of these various size knife blades is same as that shown in FIG. 9 and explained above. The same lower knife blade 70 can be used for all size upper knife blades 69. It may be preferable, however, to use a larger diameter lower blade 70 with a larger diameter upper blade 69, and to use a lower knife blade 70 having a greater angled circumferential edge for cutting triple rib spiral seamed pipe. The positioning of the lower knife blade 70 relative to the upper knife blade 69 as described in connection with the first slitter 50 is also applicable in the second slitter 200.

Figure 18:
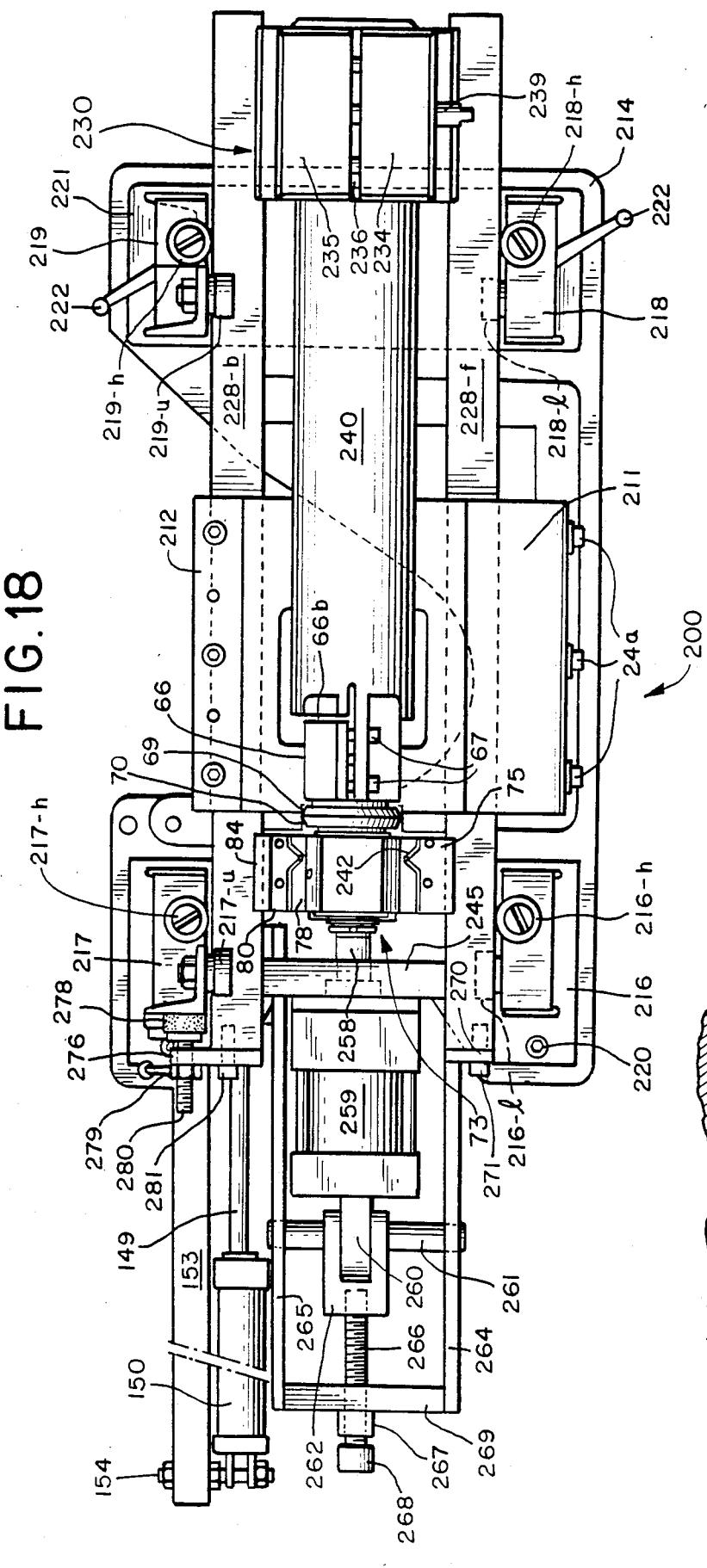
FIG. 18 is a plan view of the second preferred embodiment of the present invention.
Figure 18A:
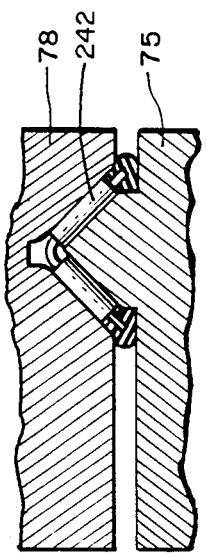
FIG. 18a is an enlarged plan view of the needle bearings shown in FIG. 18.
Figure 19:
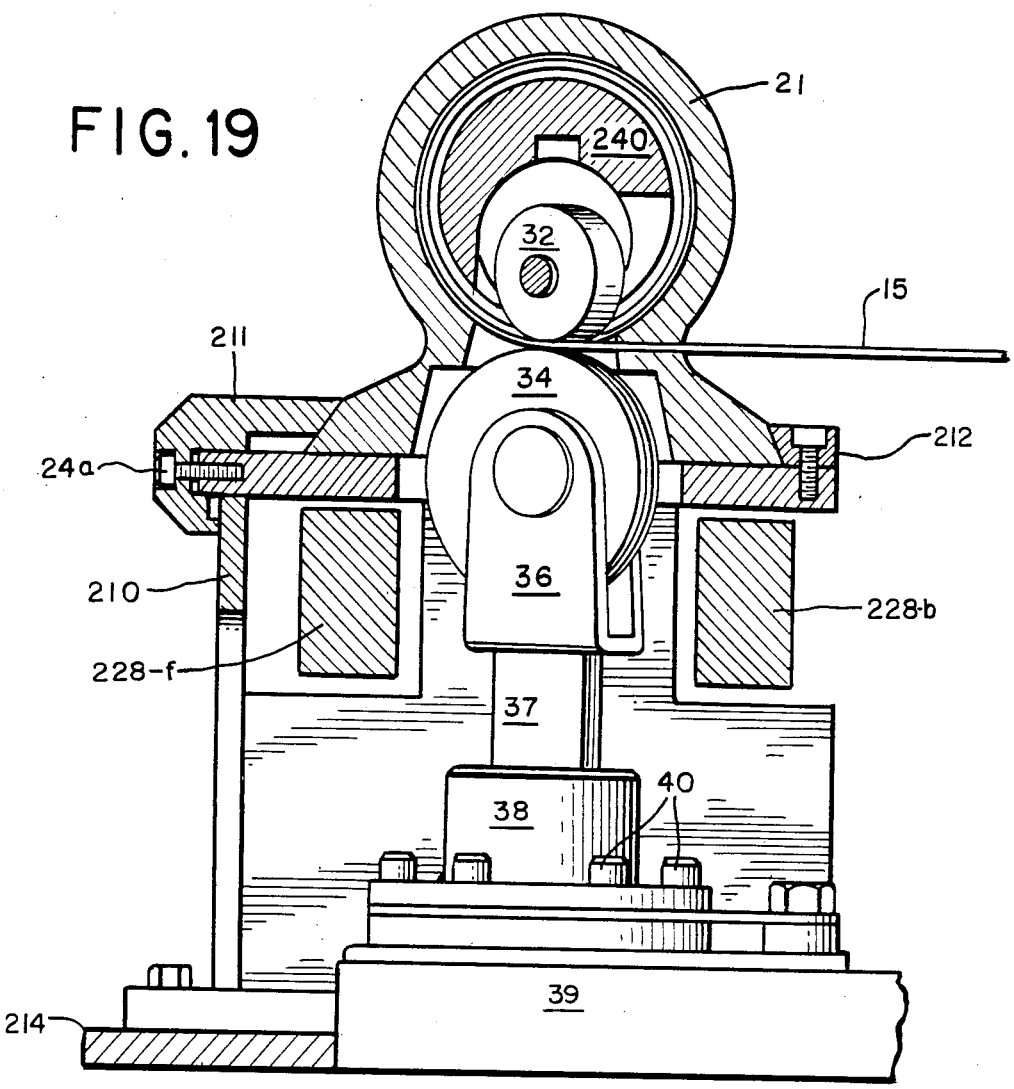
FIG. 19 is a sectional view taken through lines 19—19 of FIG. 17.
Figure 22:
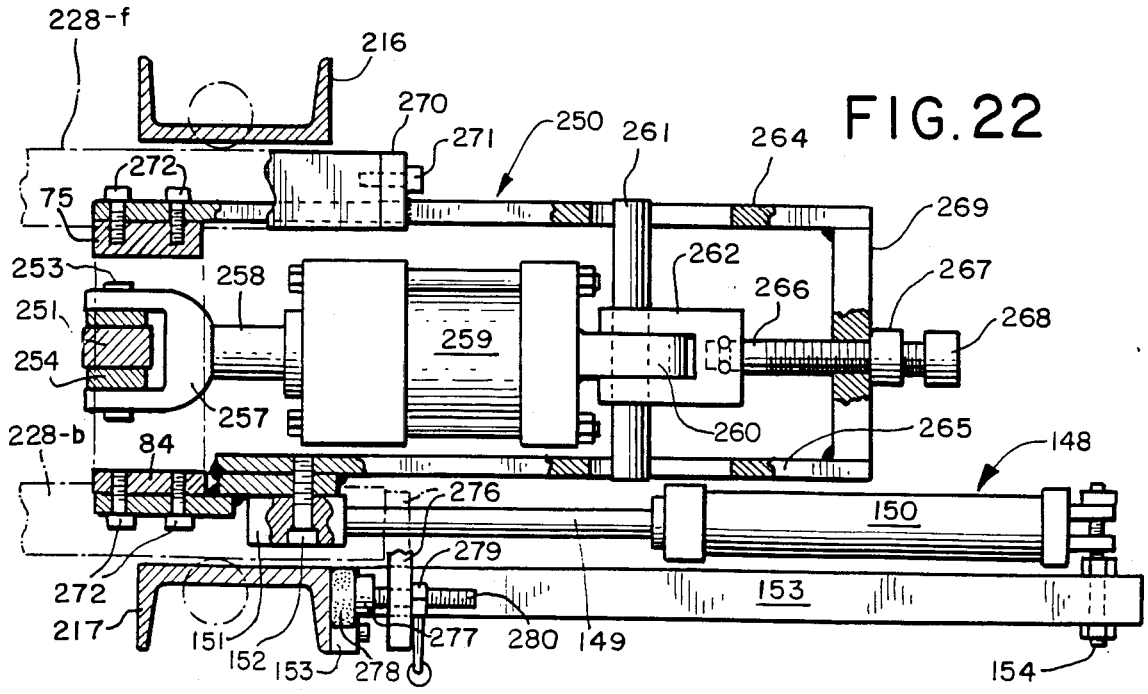
FIG. 22 is a sectional view taken through lines 22—22 of FIG. 17.
Figure 20F:
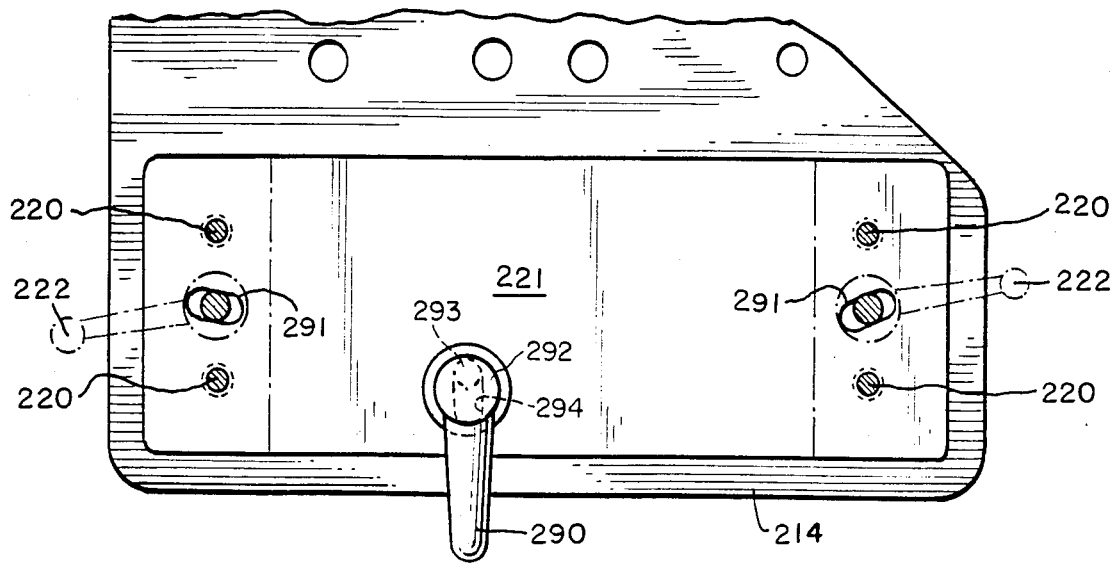
FIG. 20f is a sectional view taken through lines 20f—20f of FIG. 20.
Figure 20G:
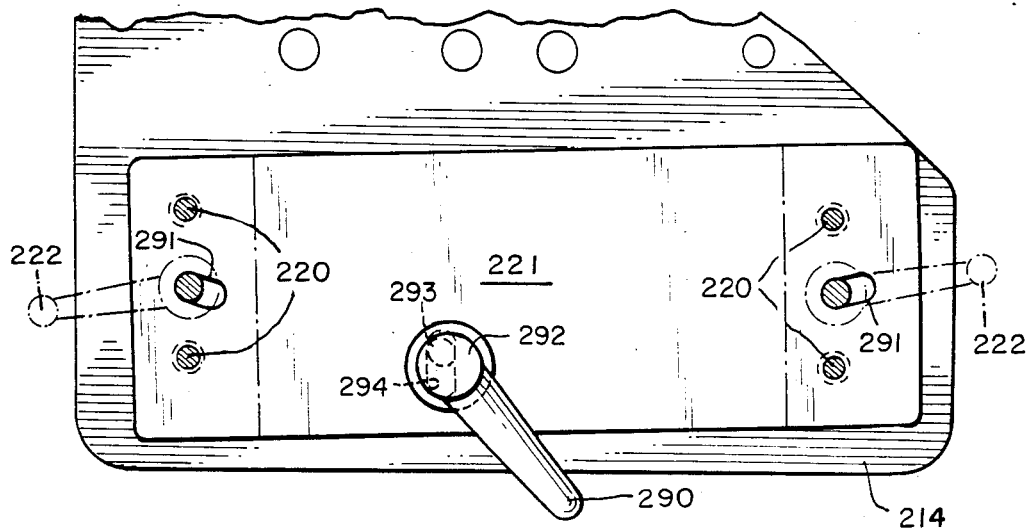
FIG. 20g shows the elements in FIG. 20f with the pitch adjustment plate and pitch adjustment lever rotated counterclockwise.
Figure 23:
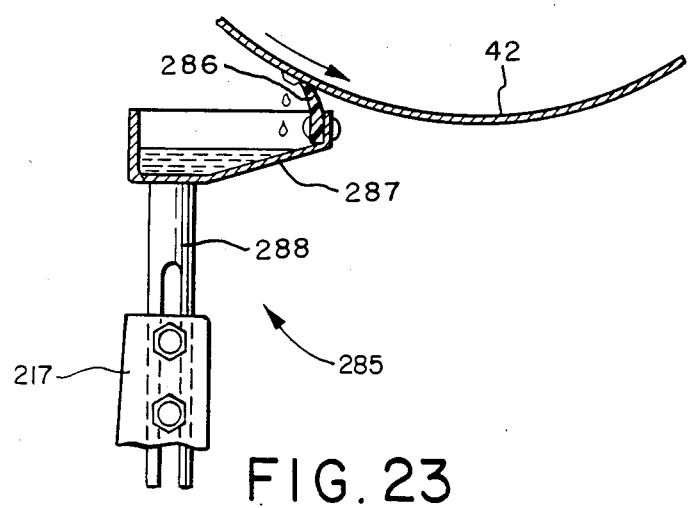
FIG. 23 is a cross-sectional view of the wiper assembly that is used with second preferred embodiment of the present invention.
Figure 21:
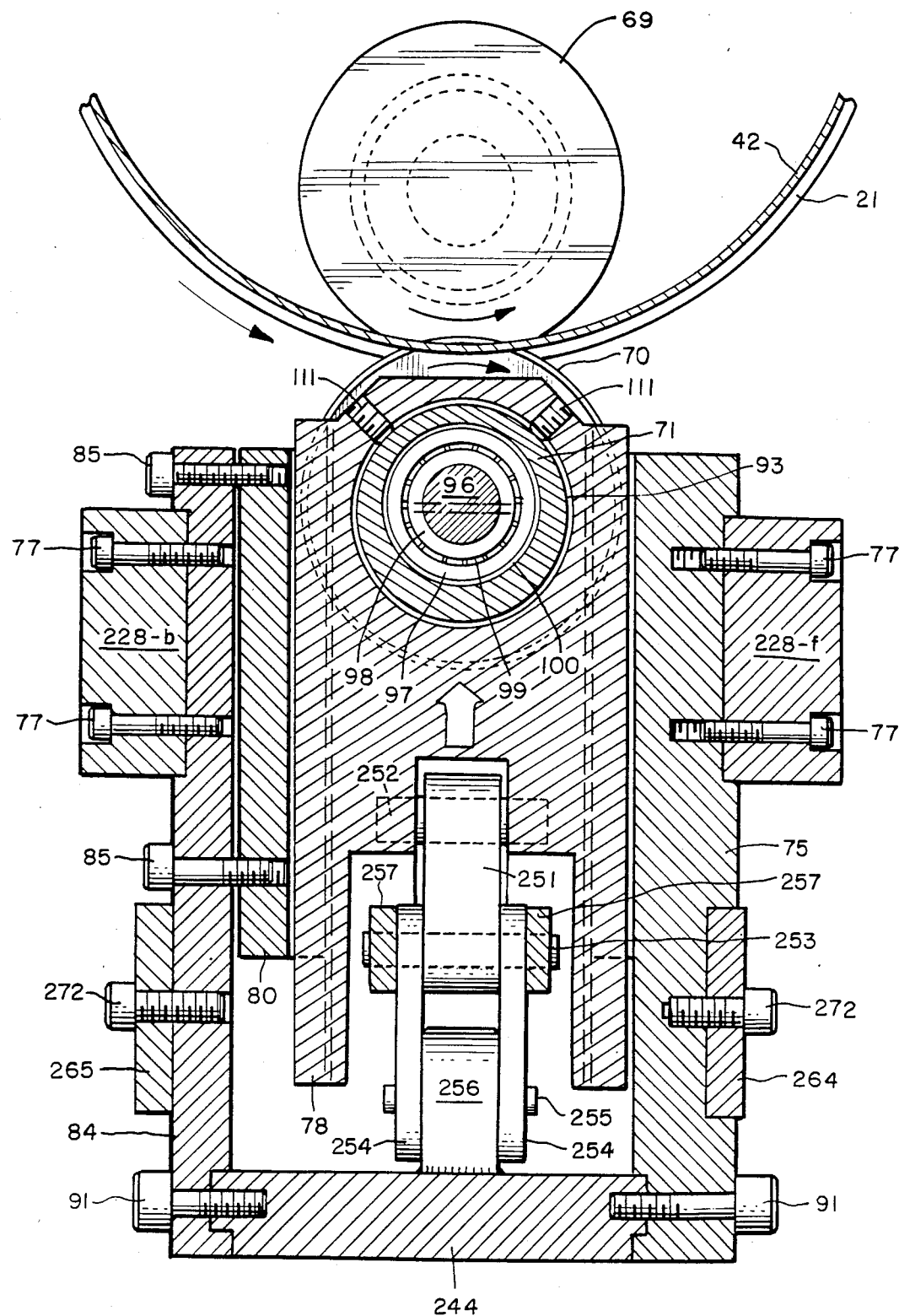
FIG. 21 is a sectional view taken through lines 21—21 of FIG. 17.

As shown in FIGS. 16–18 and 20, the lower knife guide assembly 73 used in the second slitter assembly 200 is essentially the same in function and design as that shown and described above with respect to the first slitter 50. Several components of the lower knife guide assembly 73 have been made bigger and heavier for the second slitter 200 to make the lower knife holder assembly 73 better suited for heavy duty pipe cutting applications. For example, the widths of the legs and the center section 78 have been slightly increased. Strut 244, which ties the outer legs 75 and 84 together, has been made bigger and heavier. FIGS. 21 and 22 also show that minor changes have been made to attach the lower knife guide assembly 73 to the new guide rails 228 and to the modified toggle cylinder assembly 250 (described below). Slightly different v-shaped needle bearing strips 242 are used. (See FIG. 18a) These needle bearing strips, also sold by IKO Bearings, are single-piece strips having a 90 degree bend, as opposed to the two strips 87 which were positioned at a right angle in the first slitter. The new bearing strips 242 do not require the retaining lip (shown in phantom in FIG. 9) to remain in place. The new bearing strips 242 are also heavier since they are used in heavy duty applications.

The lower knife housing 71 and lower knife blade 70 used in the second slitter assembly 200 are also essentially the same as that shown and described above in connection with the first slitter assembly 50. Again, however, some components have been made bigger and heavier for cutting heavier pipes. For example, the diameter of the knife shaft 96, the outer diameter of the eccentric housing 71, the lockwasher and bearings are larger. Other than these types of dimensional changes, the design and function of the lower knife housing 71, the lower knife blade 70, and their associated parts are the same as previously described.

The design and function of the upper knife housing 68 and upper knife 69 of the second slitter 200 is identical to that of the lower knife housing 71 and lower knife blade 70. These parts are still intended to be interchangeable, when the upper and lower knife blades 69 and 70 are the same size.

A new heavy duty toggle cylinder assembly 250 is used with the second embodiment of the slitter assembly 200 to move the center section 78 of the lower knife guide assembly 73, and hence the lower knife 70, up and down. This particular toggle cylinder assembly 250 uses a 3.5 inch diameter, 1 inch stroke pneumatic cylinder sold by Milwaukee Cylinder Co. The second toggle cylinder assembly 250 has a single upper toggle link 251 which is pivotally connected to the center knife holder section 78 with an upper pin 252. The upper toggle link 251 is also pivotally connected to a central pin 253. The lower toggle links 254 comprise two pieces which are pivotally connected at one end to the central pin 253, and at the other end to a lower pin 255. The lower pin 255 couples the lower toggle links 254 with the projection 256, which is integral with the strut 244. A yoke 257 couples the central pin 253 to a piston rod 258, which slides in and out of one end of the cylinder barrel 259. A trunnion 260 is connected to the opposite end of the cylinder barrel 259. A bar 261 extends through the trunnion 260, a second yoke 262, and the oval slots 263 in the support brackets 264 and 265. The support brackets 264, 265 carry the the toggle cylinder assembly 250. The front bracket 264 is attached to the bottom of the first leg 75 of the lower knife holder assembly 73 by bolts 272, and to the front guide rail 228-f by a flange 270. The flange 270 is welded to the front support bracket 265 and is attached to the left end of the front guide rail 228-f with bolts 271. The back bracket 265 is attached to the bottom of the second leg 84 of the lower knife holder assembly 73 with bolts 272. The left ends of the support brackets 264, 265 are tied together with an end plate 269. A threaded shaft 266 extends from the second yoke 262 through an opening in the end plate 269. A complementarily threaded locking lever 267 is located on the threaded shaft adjacent the end plate 269. An adjustment lever 268 is attached to the end of the threaded shaft 266 for turning the threaded shaft.

The second toggle cylinder assembly 250 operates in the same manner and performs the same function described above for the first toggle cylinder assembly 115. In short, it moves the lower cutting knife 70, through the center section 78 of the lower knife holder, into and out of its overlapping, cutting position with the upper knife blade 69. The toggle cylinder assembly 250 is also adapted to move axially with the guide rails 228 and lower knife holder assembly 73. The description of the function and operation of the first toggle cylinder assembly 115 is thus applicable here.

There are, however, several minor structural differences between the second toggle cylinder assembly 250 and the first toggle cylinder assembly 115. For example, the support brackets 264 and 265 are separated the width of the lower knife holder assembly 73 for their entire length to provide support for the heavier toggle cylinder. The diameter of the upper, central and lower pins 252, 253 and 255, respectively, has almost been doubled to prevent them from bending under heavier loads. (These three pins have the same size diameter.) The upper toggle link 251 is one solid piece, and the lower toggle links 254 are placed next to the upper toggle link (compare FIG. 8) to require less force and lighter bearings for lifting the lower knife holder assembly 73.

Slightly different means are also used for adjusting the cutting and rest positions of the lower knife 70 with the second toggle cylinder assembly 250. The locking lever 267 is merely turned until loose. The depth adjustment lever 268 is then turned to move the cylinder barrel 259 axially along the slots 263 in the support brackets 264, 265. The locking lever 267 is then tightened when the desired adjustment is made. No separate tool is required, as it is with the nut 129 of the first toggle cylinder assembly 115.

Other structural differences between the second toggle cylinder assembly 250 and the first toggle cylinder assembly 115 will be readily apparent from the drawings, and thus require no further discussion. It should be understood that many of the structural features of the second toggle cylinder assembly 250 (e.g. the single upper toggle link 251) would be preferred in the first toggle cylinder assembly 115 as well.

The second slitter 200 assembly also includes a friction compensating air cylinder 148. The structure, function and operation of this air cylinder assembly 148 is essentially the same as the described above for the first slitter assembly 50. In short, the friction compensating cylinder 148 provides friction compensation for the guide roller system; the pressure in the cylinder 148 should balance the friction in the system so that the knife blades 69 and 70 will move laterally at the touch of the finger. FIG. 22 clearly illustrates how the constituent parts of the friction compensating cylinder 148 are attached to the various parts of the second slitter assembly 200.

A substantially simplified wiper assembly 285 is used with the second slitter embodiment 200. (See FIGS. 16 and 23) This wiper assembly is positioned closer to the backside of the slitter assembly. The wiper blade 286 is mounted in the tray 287. The tray 287 is mounted on a post 288, which is attached to the right side of the back, left base leg 217. The post 288 has a slot which allows adjustment of the height of the wiper assembly. As the pipe 42 rotates past the wiper blade, excess lubrication fluid is wiped off the pipe.

A new element of the second slitter assembly 200 is an adjustable linear motion (or axial motion) stop 276. (See FIGS. 18 and 22) The stop plate 276 is attached to the left end of the back guide rail 228-b with bolts 281. A threaded bolt 280 is secured to the stop plate 276 with a nut 279. A lever is attached to the nut for ease of adjustment. The head 277 of the bolt 280 engages a rubber pad 278 affixed to the back, left base leg 217 on the side opposite the wiper assembly 285. When the friction compensating cylinder 148 returns the guide rails 228 and attached cutting knives 69, 70 towards their starting position after a cut is completed, the bolt head 277 will engage the rubber pad 278 to terminate the linear (axial) return motion. The stop plate 276 thus controls the starting position for the cutting blades 69 and 70. The starting position can be adjusted by adjusting the distance between the stop plate 276 and the bolt head 277.

The starting position of the knife blades 69, 70 usually needs to be adjusted whenever the forming head 21 is changed to make new pipe having a different radius. The different size forming head and pipe will usually change the location of the lockseam relative to the knife blades. Thus, it is advantageous to adjust the starting position of the knife blades, so that the knives will initiate the cutting process just before the lockseam for the reasons stated above.

Another different feature of the second slitter assembly 200 is the manner of adjusting the pitch of the slitter. (See, e.g., FIGS. 20-20g) As explained above, the right base legs 218 and 219 of this slitter 200 are attached to the base adjustment plate 221, so that these legs and plate 221 can be moved together. The right base legs 218 and 219 and pitch adjustment plate 221 are provided with angled adjustment slots 291 which allow these connected base legs to be moved side-to-side along an arcuate path. A lever 290 is used to effect the pitch adjustment of the slitter assembly. This pitch adjustment lever 290 has a first circular shaft 292 that is rotatably mounted in the base adjustment plate 221, and a second circular shaft 293 that is eccentrically mounted on the first shaft 292 and is rotatably mounted in an oval slot 294 in the slitter base plate 214.

The pitch of the slitter assembly 200 is adjusted in the following manner. The threaded bolts and locking levers 222 on the right base legs 218, 219 are loosened, so that the right base legs and pitch adjustment plate 221 are freed from the base plate 214. The pitch adjustment lever 290 is then turned counterclockwise, for example, which causes the pitch plate 221 and attached right base legs to rotate counterclockwise along their adjustment slots 291. (See FIG. 20g) When the pitch of the slitter achieves the proper alignment between the upper and lower knife blades 69,70 (i.e., to attain a clean, rectangular pipe cut), the locking levers 222 are tightened to lock the right base legs and pitch adjustment plate 221 to the base plate 214.

The pitch adjustment means of the second slitter 200 eliminates the need for adjustment slots on all four base legs and the pivot pin 156. In the first slitter assembly 50, bolts on each base leg had to be loosened, so that the slitter could then be rotated around the pivot pin. The pitch of the second slitter 200 can be adjusted from the right legs only because the guide rollers will accommodate some pitch adjustment (about ⅜ inch in each direction).

The operation of the first slitter assembly 50 described above, with particular reference to FIGS. 14 and 15, is applicable to the second slitter assembly 200 as well. Thus, further description of the operation of the second slitter 200 with reference to FIGS. 14 and 15 is not necessary.

The previously described advantages of the first slitter assembly 50 over power driven friction saws are also provided by the second slitter assembly 200. Moreover, the second slitter assembly 200 provides advantages over the first slitter assembly 50. For example, the design of the second slitter makes it easier to manufacture, operate and adjust. The second slitter assembly 200 is also especially designed for cutting metal pipe that is 16 gauge and thinner. The first slitter assembly 50 was best suited for pipe 24 gauge and thinner. Still further advantages of the second slitter assembly 200 will be apparent to those skilled in the art.

It should be understood that various changes and modifications to the preferred embodiment described above will be apparent to those skilled in the art. For example, the preferred embodiment of the invention uses idle, rotatable knife blades. It is possible that the same type of knife blades could be driven with a motor, although that would defeat some of the advantages of the invention.

It is intended that the foregoing description be regarded as illustrative rather than limiting, and that it be understood that it is the following claims, including all equivalents, which are intended to define the scope of the invention.

I claim:

1. For use with a machine for producing spiral seamed hollow pipe from a metal strip including drive means for feeding the strip through the machine, means for forming the strip into a spiral cylinder so that the outer edges of the strip are adjacent each other, and means for joining the adjacent edges to produce a spiral seamed pipe, and the pipe moving in an axial direction while it rotates, a pipe cutting apparatus comprising:

a first rotatable knife blade mounted for positioning inside the pipe and adapted to be rotationally driven by contact with the moving pipe;

a second rotatable knife blade mounting for positioning outside of the pipe and adapted to be rotationally driven by contact with the moving pipe;

means for moving the second blade between a first position where the pipe can move freely by the second blade and a second position where the first and second knife blades will overlap and puncture the pipe; and guide means for allowing the pipe to pull the first and second knife blades in their overlapping, second position with the pipe as the pipe moves in an axial direction, so that the first and second blades cooperate to cut the pipe as it moves axially and rotates between the overlapping first and second blades.

2. In a machine for continuously producing spiral seamed hollow pipe from a metal strip including drive means for feeding the strip through the machine, means for forming the strip into a spiral cylinder so that the outer edges of the strip are adjacent each other, and means for joining the adjacent edges to produce a spiral seamed pipe, the pipe moving in an axial direction while it rotates, and the pipe having a front opening that moves away from the machine and a back opening in the forming means, the improvement comprising:

a first passively rotatable cutting blade mounted in a front end of a boom, the boom and first blade fitting inside the pipe, a back end of the boom extending through the back opening of the pipe and the forming means, and the boom and first blade positioned inside the pipe so that the axis of the first blade is parallel to the pipe axis and the circumferential edge of the first blade is adjacent to the inner pipe surface;

a second passively rotatable cutting blade mounted in a holding means, the holding means and second blade positioned outside of the forming means and the pipe so that the axis of the second blade is parallel to the axis of the pipe and the circumferential edge of the second blade is adjacent to the circumferential edge of the first blade in a lateral direction;

means for moving the holding means towards the pipe so that the circumferential edges of the first and second cutting blades overlap and puncture the pipe; and guide means for allowing the pipe to pull the overlapping first and second cutting blades with the pipe as the pipe moves in an axial direction, so that the first and second blades cooperate to cut the pipe perpendicular to the pipe axis as the pipe moves axially and rotates between the overlapping edges of the first and second blades.

3. The invention of claim 2 wherein the guide means includes a least one rail which slides in the direction of the pipe, means for connecting the back end of the boom to the rail, means for connecting the holder means to the rail, and means for connecting the moving means to the rail.

4. The invention of claim 3 wherein the guide means further includes means for pulling the rail in the axial direction of the pipe to assist axial movement of the overlapping first and second blades with the axially moving pipe, and for returning the rail to its starting position.

5. The invention of claim 4 wherein the holding means includes a first leg attached to a first rail, a second leg attached to a second rail, and a center section which holds the second cutting blade and moves between the first and second legs in a direction perpendicular to the pipe axis.

6. The invention of claim 5 wherein the holding means further includes a third leg positioned between the center section and the second leg, bearing means positioned between the first leg and the center section and between the third leg and the center section so that the center section is capable of sliding between the first and third legs, and means engaging the second leg and the third leg for applying pressure on the bearing means and the center section.

7. In a machine for continuously producing spiral seamed hollow pipe from a metal strip including drive means for feeding the strip through the machine, a looped-shaped means for forming the strip into a spiral cylinder so that the outer edges of the strip are adjacent each other, and means for joining the adjacent edges to produce a pipe having a spiral lockseam seam, the lockseam being at least twice as thick as the metal strip, the pipe moving in an axial direction while it rotates, and the pipe having a front opening that moves away from the forming means and a back opening in the forming means, the improvement comprising:

a first circular, passively rotatable knife blade mounted in a front end of a boom, the boom and first blade fitting inside the pipe, a back end of the boom extending through the back opening of the pipe and the forming means, and the boom and first blade positioned inside the pipe so that the axis of the first blade is parallel to the pipe axis and the circumferential edge of the first blade is adjacent to the inner pipe surface;

a second circular, passively rotatable knife blade mounted in a holding means, the holding means and second blade positioned outside of the forming means and the pipe so that the axis of the second blade is parallel to the axis of the pipe and the circumferential edge of the second blade is separated from the circumferential edge of the first blade by a fixed lateral distance;

means for moving the second knife blade between a first position where the pipe can move freely past it and a second position where the circumferential edges of the first and second cutting blades overlap and puncture the pipe, wherein the moving means and holding means cooperate to maintain the fixed lateral separation between the first and second cutting blades; and guide means for allowing the pipe to pull the first and second knife blades in their second, overlapping position with the pipe as the pipe moves in an axial direction, so that the first and second blades cooperate to cut the pipe perpendicular to the pipe axis as the pipe moves axially and rotates between the overlapping edges of the first and second blades.

8. The invention of claim 7 wherein the guide means includes first and second rails which slide in the axial direction of the pipe, means for connecting the back end of the boom and the first and second rails, means for connecting the holding means to the first and second rails, and means for connecting the moving means to the rail, and means for pulling the first and second rails in the axial direction of the pipe to assist axial movement of the overlapping first and second blades with the axially moving pipe.

9. The invention of claim 8 wherein the holding means includes a first leg fastened to the first rail, a second leg fastened to the second rail, a center section which holds the second knife blade and is positioned between the first and second legs, a third leg positioned between the center section and the second leg, bearing means placed between the first leg and the center section and between the third leg and the center section so that the center section is capable of sliding between the first and third legs, and means engaging the second leg and the third leg for applying pressure on the bearing means and the center section.

10. The invention of claim 7 wherein the moving means further includes means for maintaining the second cutting blade in its second, overlapping position, even when the pipe lockseam passes between the first and second overlapping cutting blades.

11. The invention of claim 10 wherein said maintaining means includes a toggle link cylinder.

12. The invention of claim 7 further comprising means for adjusting the fixed lateral distance between the first and second knife blades.

13. An apparatus for cutting pipe which is continuously formed from a metal strip, wherein the pipe has a spiral lockseam which is at least twice as thick as the metal strip, and the pipe moves axially and rotates while it is produced, comprising:
- only one inner rotatable cutting blade mounted for positioning inside the pipe and held in a fixed position relative to the inner pipe surface by a rigid boom, said inner blade adapted to be rotationally driven by contact with the moving pipe;
- only one outer rotatable cutting blade mounted for positioning outside of the pipe, and the outer blade being connected to the boom and separated from the inner blade by a fixed lateral distance, said outer blade adapted to be rotationally driven by contact with the moving pipe;
- means for moving the outer blade between a first position where the pipe can move freely past the outer blade and a second position where the outer and inner blades will overlap and puncture the pipe, and the moving means and boom cooperating to constantly maintain the fixed lateral separation between the inner and outer blades; and
- means for allowing the inner and outer cutting blades to be pulled by the pipe as it moves in an axial direction when the inner and outer blades are in their second, overlapping position so that the inner and outer blades will cooperate to cut the pipe when it moves axially and rotates between them in their overlapping second position.

14. The invention of claim 13 further comprising means for adjusting the fixed lateral distance between the first and second knife blades.

15. For use with a machine for continuously producing spiral seamed pipe from a metal strip including drive means for feeding the strip through the machine, means for forming the strip into a spiral cylinder so that the outer edges of the strip are adjacent each other, and means for joining the adjacent edges to produce a spiral seamed pipe, the pipe moving axially while it rotates and having a front opening that moves away from the machine and a back opening in the forming means, an apparatus for cutting spiral seamed pipe comprising:
- a first passively rotatable knife blade mounted in a front end of a boom, the boom and first blade to be positioned through the forming means and inside the pipe so that the axis of the first blade will be parallel to the pipe axis and the circumferential edge of the first blade will be adjacent to the inner pipe surface;
- a second passively rotatable knife blade mounted in a holding means to be positioned outside of the forming means and pipe so that the axis of the second blade will be parallel to the axis of the pipe and the circumferential edge of the second blade is separated from the circumferential edge of the first blade by a fixed lateral distance;
- means for moving the holding means and second blade towards the first blade so that the circumferential edges of the first and second knife blades will overlap to puncture the pipe; and
- guide means for allowing the first and second knife blades to be pulled by the pipe as it moves in an axial direction when the first and second blades overlap, so that the first and second blades will cooperate to cut the pipe when the pipe moves axially and rotates between the overlapping edges of the first and second blades.

16. The invention of claim 15 wherein the guide means includes a least one sliding rail, means for connecting the back end of the boom to the rail, means for connecting the holder means to the rail, and means for connecting the moving means to the rail.

17. The invention of claim 16 wherein the holding means further includes a first leg attached to a first rail, a second leg attached to a second rail, a center section for holding the second blade and positioned between the first and second legs, a third leg positioned between the center section and the second leg, bearing means positioned between the first leg and the center section and between the third leg and the center section so that the center section is capable of sliding between the first and third legs, and means engaging the second leg and the third leg for applying pressure on the bearing means and the center section.

18. The invention of claim 15 further comprising means for adjusting the fixed lateral distance between the first and second knife blades.

19. An apparatus for cutting continuously produced, spiral seamed pipe, where the pipe moves axially and rotates while it is produced, comprising:
- a first passively rotatable knife blade mounted in a front end of a boom and having a circumferential cutting edge, the rotational axis of the first blade being parallel to the boom axis;
- a second passively rotatable knife blade mounted in a holding means and having a circumferential cutting edge, the holding means positioning the second blade so that the rotational axis of the second blade is parallel to the rotational axis of the first blade, the cutting edge of the second blade is adjacent to the cutting edge of the first blade in a lateral direction, and, in a first position, the cutting edge of the second blade is displaced from the cutting edge of the first blade in a direction normal to the rotational axis of the second blade;
- means for moving the second blade in the direction normal to its rotational axis to a second position where the circumferential edges of the first and second knife blades overlap; and
- means for connecting a back end of the boom to the holding means so that the first and second blades will maintain a fixed lateral separation; and
- guides means for allowing the first and second knife blades to be pulled by the pipe as it moves in an axial direction when the first and second blades are in the overlapping, second position, so that the first and second blades will cooperate to cut the pipe when it moves axially and rotates between the overlapping edges of the first and second knife blades.

20. The invention of claim 19 wherein the first knife blade includes a shaft positioned along the axis of a bore in an eccentric housing, and the housing being rotatable within a cavity in the front end of the boom.

21. The invention of claim 19 wherein the second knife blade includes a shaft positioned along the axis of a bore in an eccentric housing, and the housing being rotatable within a cavity in the holding means.

22. The invention of claim 19 wherein the holding means includes a first leg fastened to a first rail, a second leg fastened to a second rail, a center section which holds the second blade and is positioned between the first and second legs, a third leg positioned between the center section and the second leg, bearing means placed between the first leg and the center section and between the third leg and the center section so that the center section is capable of sliding between the first and third legs, and means engaging the second leg and the third leg for applying pressure on the bearing means and the center section.

* * * * *

UNITED STATES PATENT AND TRADEMARK OFFICE
CERTIFICATE OF CORRECTION

PATENT NO. : 4,706,481

DATED : November 17, 1987

INVENTOR(S) : Wilhelmus P.H. Castricum

Page 1 of 3

It is certified that error appears in the above-identified patent and that said Letters Patent is hereby corrected as shown below:

IN THE DETAILED DESCRIPTION
OF A PREFERRED EMBODIMENT

In column 3, line 64, after "U.S. Pat. No. 4,567,742", please insert a comma (,);

In column 4, line 59, please delete "clincing" and substitute therefor --clinching--;

In column 6, line 12, please delete "means" and substitute therefor --mean--;

In column 8, line 65, please delete "wedge" and substitute therefor --edge--;

In column 10, line 42, please delete "withe" and substitute therefor --with--;

In column 15, line 26, please delete "of the vertical" and substitute therefor --of a vertical--;

In column 16, line 41, please delete "because" and substitute therefor --became--;

UNITED STATES PATENT AND TRADEMARK OFFICE
CERTIFICATE OF CORRECTION

PATENT NO. : 4,706,481

DATED : November 17, 1987

INVENTOR(S) : Wilhelmus P.H. Castricum

It is certified that error appears in the above-identified patent and that said Letters Patent is hereby corrected as shown below:

In column 16, line 48, please delete "the is still" and substitute therefor --and is still--;

In column 18, line 66, please delete "same as the" and substitute therefor --same as that--;

In column 19, line 4, please delete "the finger" and substitute therefor --a finger--.

IN THE CLAIMS

In Claim 1 (column 20, line 59), please delete "mounting" and substitute therefor --mounted--;

In Claim 3 (column 21, line 44), please delete "a least" and substitute therefor --at least--;

In Claim 8 (column 22, line 50), please delete "and the first" and substitute therefor --to the first--;

UNITED STATES PATENT AND TRADEMARK OFFICE
CERTIFICATE OF CORRECTION

PATENT NO. : 4,706,481
DATED : November 17, 1987
INVENTOR(S) : Wilhelmus P.H. Castricum It is certified that error appears in the above-identified patent and that said Letters Patent is hereby corrected as shown below:

In Claim 16 (column 24, line 13), please delete "a least" and substitute therefor --at least--;

In Claim 19 (column 24, line 57), please delete "guides" and substitute therefor --guide--.

Signed and Sealed this

Fourteenth Day of February, 1989

Attest:

DONALD J. QUIGG

*Attesting Officer*   *Commissioner of Patents and Trademarks*